United States Patent
Hong

(10) Patent No.: US 9,476,465 B2
(45) Date of Patent: Oct. 25, 2016

(54) SPATIAL WEDGING FRICTION OVERRUNNING CLUTCH

(76) Inventor: Tao Hong, Guangdong (CN)

( * ) Notice: Subject to any disclaimer, the term of this patent is extended or adjusted under 35 U.S.C. 154(b) by 757 days.

(21) Appl. No.: 13/381,262

(22) PCT Filed: Jun. 28, 2010

(86) PCT No.: PCT/CN2010/074619
§ 371 (c)(1),
(2), (4) Date: Dec. 28, 2011

(87) PCT Pub. No.: WO2011/000300
PCT Pub. Date: Jan. 6, 2011

(65) Prior Publication Data
US 2012/0103743 A1    May 3, 2012

(30) Foreign Application Priority Data
Jun. 29, 2009   (CN) .......................... 2009 1 0158647

(51) Int. Cl.
*F16D 41/063* (2006.01)
*F16D 41/061* (2006.01)

(52) U.S. Cl.
CPC .................................. *F16D 41/063* (2013.01)

(58) Field of Classification Search
CPC .................................................. F16D 41/063
USPC ....................................................... 192/54.5
See application file for complete search history.

(56) References Cited

U.S. PATENT DOCUMENTS

| | | | |
|---|---|---|---|
| 3,851,532 A | * | 12/1974 | Pfluger et al. .................. 74/7 A |
| 4,462,272 A | * | 7/1984 | Roper ............................. 475/240 |
| 5,443,170 A | | 8/1995 | Merker, Jr. et al. | |

FOREIGN PATENT DOCUMENTS

| | | |
|---|---|---|
| CN | 85107370 B | 8/1988 |
| CN | 2175321 Y | 8/1994 |

(Continued)

OTHER PUBLICATIONS

Zhang Jizheng, et al; "The Current Conditions and Development Expectation of Overrunning Clutch", The Third China-Japan International Conference on History of Mechanical Technology, Kunming 2002, pp. 398-403.

(Continued)

*Primary Examiner* — Colby M Hansen
(74) *Attorney, Agent, or Firm* — Ladas & Parry LLP

(57) ABSTRACT

An overrunning clutch is provided with a spatial wedge-shaped mechanism including a rotation guide mechanism (G) and a traction friction mechanism (F1). The traction friction mechanism (F1) has a friction member. A guide member of the rotation guide mechanism (G) preferably has a helical tooth guide surface. The rotation guide mechanism (G) and the traction friction mechanism (F1) are rigidly, axially linked by a common annular intermediate member, which has complementary guide surfaces and a rotation friction surface. The lead angle of the guide surfaces is less than the maximum value of the lead angle which is capable of ensuring self locking of the friction pairs between the guide surfaces, so that the intermediate member can be wedged between the guide member and the friction member, and then transfer torque therebetween. The invention has many advantages such as fully surface contact, a simple structure, no disperse and asymmetry rotation members, and various beneficial operating conditions can be achieved conveniently by the direction controllable scheme.

20 Claims, 10 Drawing Sheets

(56) References Cited

FOREIGN PATENT DOCUMENTS

| CN | 2212681 Y | 11/1995 |
| CN | 1292464 A | 4/2001 |
| CN | 2479288 Y | 2/2002 |
| CN | 2728825 Y | 9/2005 |
| CN | 101117987 A | 2/2008 |
| CN | 101672335 A | 3/2010 |
| DE | 3836552 A1 | 5/1989 |
| FR | 2548301 A1 | 1/1985 |
| GB | 12891 A | 0/1905 |
| GB | 195307 A | 3/1923 |
| GB | 463608 A | 4/1937 |
| JP | 35-25711 B | 10/1960 |
| JP | 03-213751 A | 9/1991 |
| JP | 05-256329 A | 10/1993 |
| JP | 8-120652 A | 5/1996 |
| JP | 2000-227128 A | 8/2000 |
| JP | 2001-107989 A | 4/2001 |
| JP | 3525711 B2 | 5/2004 |
| JP | 2006-038183 A | 2/2006 |

OTHER PUBLICATIONS

International Search Report: mailed Oct. 28, 2010; PCT/CN2010/074619.
Japanese Office Action dated Feb. 18, 2014; Patent Appln. No. 2012-516503.
Extended European Search Report dated Feb. 11, 2016; Appln. No. 10793595.9-1751/2450589 PCT/CN2010074619.

* cited by examiner

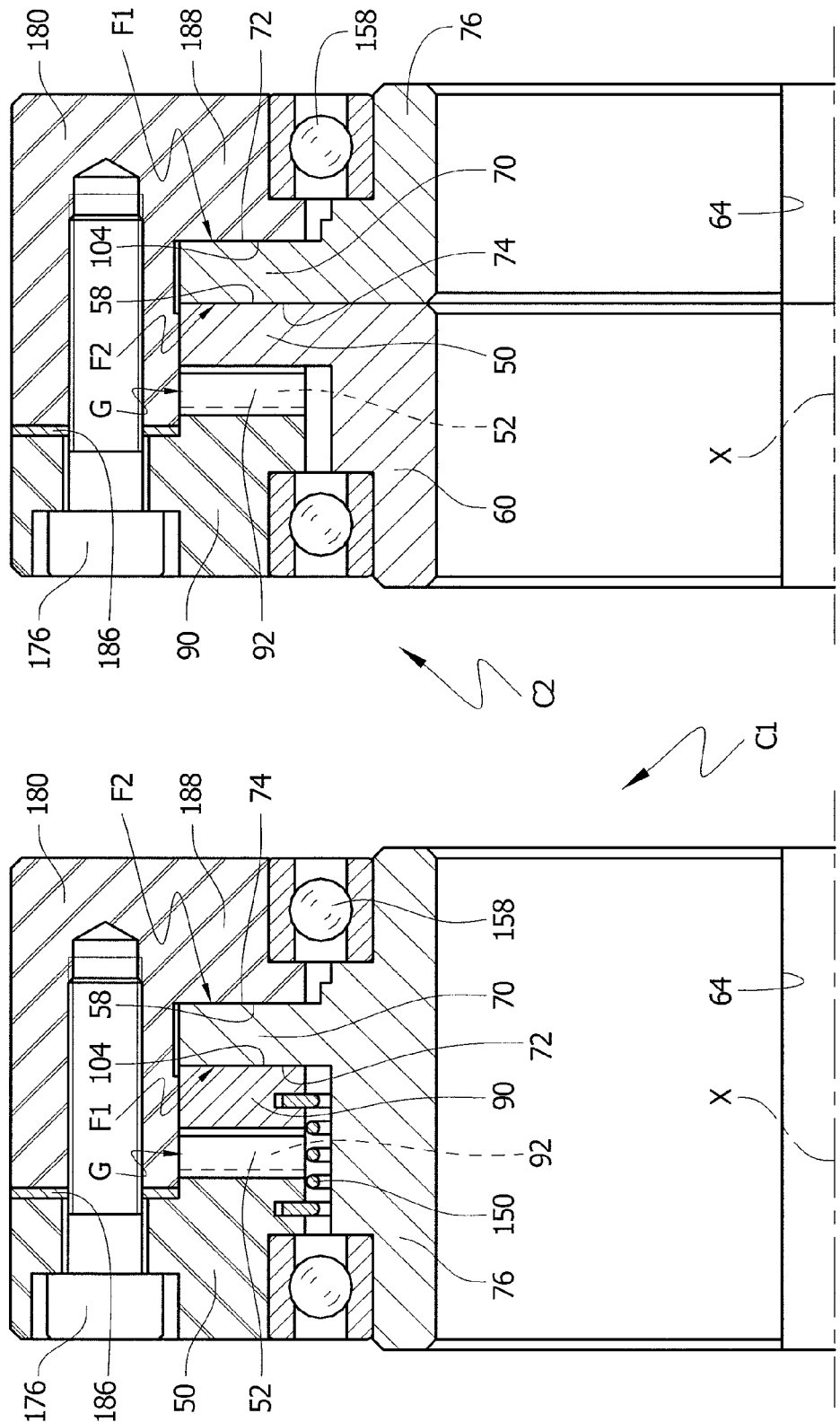

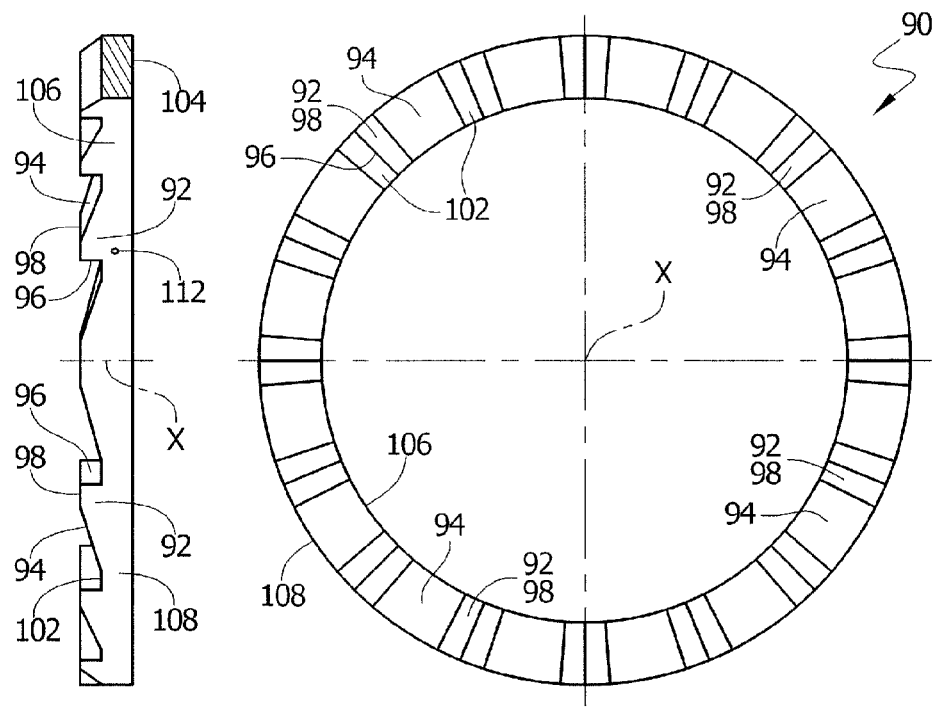
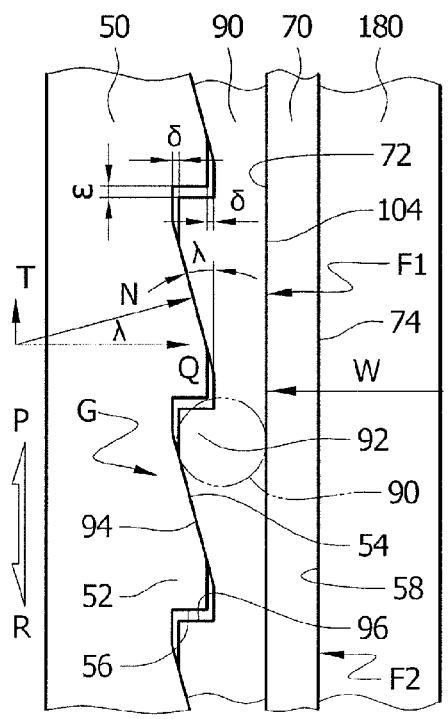
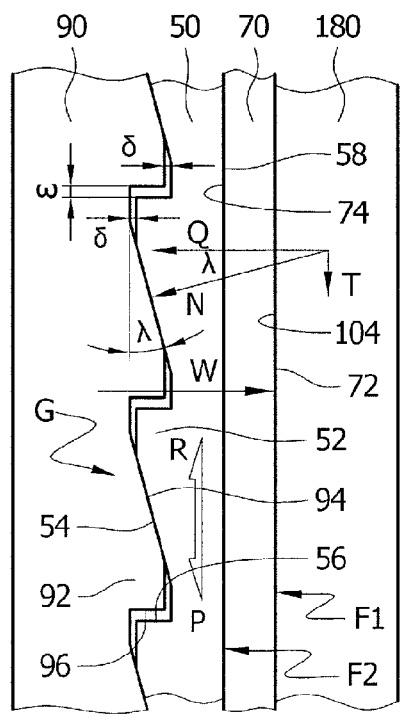
FIG. 3(a)   FIG. 3(b)
FIG. 4   FIG. 5

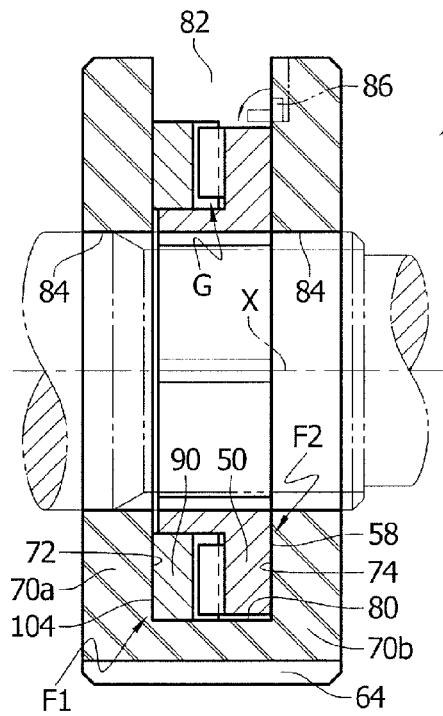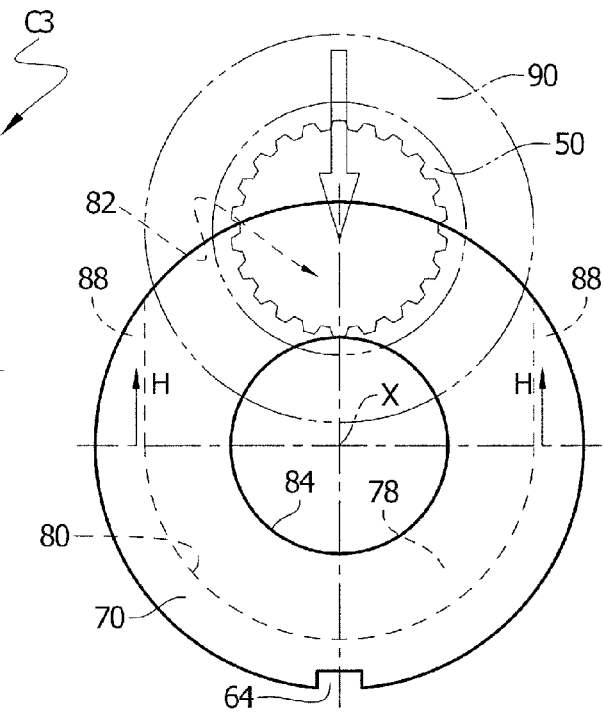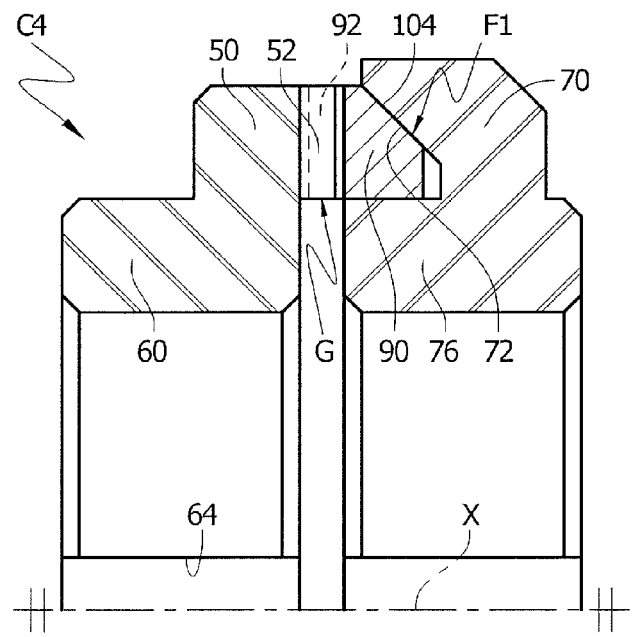

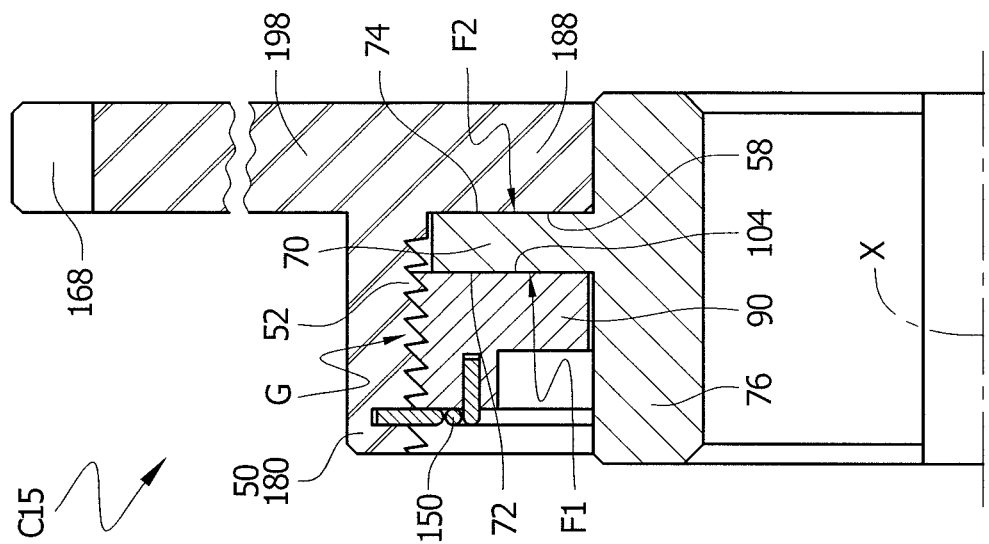
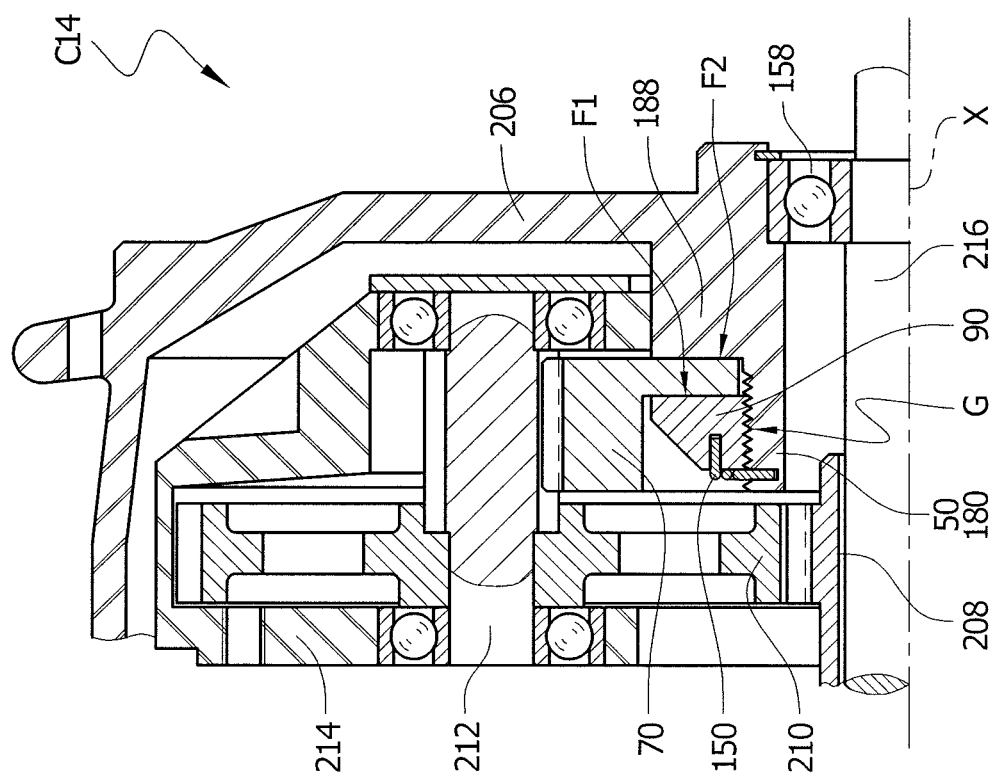

SPATIAL WEDGING FRICTION OVERRUNNING CLUTCH

RELEVANT APPLICATION

The present application claims the priority of Chinese Patent Application No. 200910158647.6, filed Jun. 29, 2009, and PCT/CN2010/074619, filed Jun. 28, 2010.

FIELD OF THE INVENTION

The present invention relates to a clutch means in the field of mechanical transmission, and devices, which include said clutch means, such as friction clutch, electromagnetic clutch, safety clutch, junction box, decelerator, glider, direction sensing device, hinge, spanner, and screw driver, and particularly it relates to a friction overrunning clutch.

BACKGROUND OF THE INVENTION

In the prior art, the friction overrunning clutches are mainly in two types, one is roller/ball type based on wedging action of wedging mechanism, and the other is diagonal bracing type based only on friction self-locking. Both of the overrunning clutches are plane movement mechanisms having inner and outer rings with overly large hollowness. The structure characteristic of such clutches inherently determines that, for coping with the inner radial movement or planar rotation, it surely has structure defect and movement defect induced by roller, diagonal bracing, and spring, which can be only discretely arranged/exist, and it surely has the physical defect that the linear contacting friction pair and the idle resistance are in direct proportion with the rotating rate. Therefore, it is naturally determined that, in the clutch, the wedging angle/contacting angle is too small, the radial force is too large, and the radial rigidity is deficient. The circumferential discretely distributing of the radial force not only induces the severe stress condition of the intermediate member, such as the roller or diagonal bracing, but also maximizes the defect of deficient radial rigidity, such that the radial elastic deformation and resilience are both excessively large, and thus the actual wedging angle/contacting angle is not secured and the wedging/engaging process is not stable, the slippage angle is too large, wedging/engaging and dewedging/disengaging becomes difficult. As a result, the actual wedging angle/contacting angle is extremely sensitive to and in direct proportion to the geometric dimension variation of the inner and outer rings, the rollers, or the diagonal bracing due to wearing out and tearing apart, as well as elastic deformation at the radial stress point of the inner and outer rings. Movement between the individual members, such as the rollers or the diagonal bracing as well as movement between the different axial portions of any of individual members, are hard to be synchronized. The individual members are often clamped too tight or crushed, and the spring/retaining mount is more often deformed or broken consequentially. As for the diagonal bracing type clutches, it may become out of order due to overturning of the diagonal bracing.

The aforesaid defects lead directly to the shortcoming of low bearing capacity, low reliability, low transmission efficiency, difficulty in manufacture and assembly, high cost, tendency of being easily worn-out and torn-apart, limited applications of such clutches in the prior art (see "Current development and tendency of overrunning clutch", Zhang Jizheng et al, the Third China-Japan International Conference on History of Mechanical Technology, Kunming, 2002, pp. 398-403). Because of lacking any better alternative technique, the overrunning clutches in the prior art are still the primary technique and products in the three application field of indexing, overrunning and backstop.

For more than 100 years, an overrunning clutch with ideal features has been searched. However, because of affection and preoccupation of the prior art, the working theory and physical essence of the planar wedging mechanism of the friction overrunning clutches are not thoroughly apprehended by the academic community and industrial community. In almost all the relevant documents, it is mistakenly believed that, the basic physical theory of torque transferring of the overrunning clutches depends on the frictionally self-locking (also known as self-locking conditions), particularly the frictionally self-locking of the two friction pairs of the wedging mechanism, and that slippage of the clutch on non-structural deformation/damage is due to the failure/destruction of the frictionally self-locking. Therefore, the people followed the suit unconsciously, i.e., seeking the resolutions and improvements only in the planar mechanism based on the conventional understanding. After exhausting almost all of the potentials of the planar friction mechanism, such as, the capability, structure, reliability, cost and work lifespan and so on, there was still no substantial improvement, and the search finally went to a dead end. Therefore, acquiring an ideal overrunning clutch became the technical difficulty desired to be resolved for a long time.

Although the patent reference CN2175321Y discloses a non-planar friction one-way overrunning clutch based on a one-way thread pair and a conical revolving friction pair, there isn't any useful information or indication therein ensuring that the clutch would have stable engagement to transfer the torque without slippage. It states only generally that there would be no slippage situation. Accordingly, this utility model patent would not actually achieve its stated purpose.

Additionally, the patent reference CN2479288Y also discloses a similar friction one-way overrunning clutch. And the patent references CN1292464A and CN2728825Y disclose two kinds of slider for motor vehicles with generally similar structure. Similarly, these three documents do not provide any useful information, indication or suggestion ensuring that the clutches would have stable engagement to assure transferring torque without slippage.

SUMMARY OF THE INVENTION

The present invention dedicates to design a over-running clutch equipment based on a brand new technical theory to avoid the aforesaid defects.

The purpose of the present invention is to provide a spatial wedging friction overrunning clutch with a higher bearing capacity, higher rotation speed, higher reliability, longer lifespan, and simpler structure.

To achieve the above purpose, the spatial wedging overrunning clutch of present invention comprises at least one axially engaged traction friction mechanism revolving about an axis, the traction friction mechanism having at least one intermediate member and a friction member revolving about the axis and being provided with a traction friction surface, the intermediate member and the friction member being abutted against each other in the axial direction to form a traction friction pair for thereby transmitting a friction torque therebetween; at least one rotation guide mechanism, which revolves about the axis and provides an engagement force to the traction friction mechanism, wherein the rotation guide mechanism includes the intermediate member and a guide member revolving about the axis and being provided with a corresponding guide surface; when said rotation guide mechanism is engaged a lead angle λ at the abutment portion between the guide surface of the guide member and the intermediate member is greater than zero and smaller or equal to ξ, that is, 0<λ≤ξ , wherein ξ is the maximum value of the lead angle λ that enables a guide friction pair formed at the abutment portion to be self-locked.

In order to transmit directly the friction torque, it further comprises a torque transmitting friction mechanism being rigidly engaged with the guide member and the friction member.

Wherein, the range of the lead angle λ may be: ζ <μ≤ξ , or 0<λ≤ζ when ζ >0), wherein, ζ is the minimum value of the lead angle λ that enables the abutment portion of the guide friction pair to be self-locked circumferentially, and also the maximum value of the lead angle λ that enables a traction friction pair to be self-locked circumferentially.

Further, there is at least one force-limiting member, which may be attached to at most one of the guide member, the intermediate member and the friction member and then form therewith a force-closed assembly, to restrain the other two members from the axial outer end.

Further, guide member, intermediate member, friction member or force limiting member is a bag shape annular member. An inner circumferential surface thereof is provided with a half circumferential annular groove and a through hole communicating from the groove to an outer circumferential surface of the bag shape annular member.

Preferably, there is provided an elastic pre-fastening mechanism with at least one elastic member, which is used to elastically press the intermediate member or the rotating member connected circumferentially with the intermediate member against the friction member.

Optionally, at least one of the respective friction surfaces of at least one of the traction friction mechanism and the force transmitting mechanism is a frusto-conic surface with a semi-conic angle greater than 0 degree and smaller than 180 degree.

In order to increase ζ and ξ , the traction friction mechanism may be a friction mechanism having multiple friction pieces, in which two sets of axially interlaced friction pieces, each comprising at least one friction piece, are circumferentially fixed to the friction member and the intermediate member respectively.

In order to increase torque capacity, the force transmitting mechanism may be a friction mechanism having multiple friction pieces, in which two sets of axially interlaced friction pieces, each comprising at least one friction piece, are circumferentially fixed to the friction member and the guide member respectively.

In order to decrease idle friction resistance and wear, there may be at least one centrifugal mechanism having a centrifugal member and a centrifugal force action surface. The centrifugal member and the centrifugal force action surface are respectively disposed on the intermediate member and the guide member or the rotation member circumferentially fixed to the guide member.

Furthermore, the rotation guide mechanism has rotation the guide function with respect to two different circumferential directions, and the guide member has said guide surface with respect to the two different circumferential directions. It further comprises an orientation mechanism, which operatively restricts the intermediate member within at least two different circumferential areas relative to said guide member so as to restrict the intermediate member from circumferentially engaging, in the relative rotation direction, the guide member, and further define the circumferential direction corresponding to operation/guide rotation of the rotation guide mechanism.

Preferably, the orientation mechanism is a pin-slot engagement mechanism comprising at least one protrusion and at least one recess. The at least one protrusion and the at least one recess are respectively provided on the intermediate member or a rotation member circumferentially fixed with the intermediate member, and the guide member or the rotation member circumferentially fixed with the guide member.

Accordingly, the controllable overrunning clutch further comprises an actuating mechanism for changing orientation status of the orientation mechanism.

It is need to be specifically explained that the meanings of relevant concepts and terminology used in the present application are as follows.

Rotation guide mechanism: a guide mechanism that transforms the circumferential relative rotation into the movement which at least includes an axial relative movement or the tendency of the axial relative movement. It includes an integrated guide mechanism that achieves only the axial movement of, such as, slippage/rolling helical or partially helical mechanism with a strict uniform helical lead angle or a not-so-strict uniform helical lead angle, radial pin-slot mechanism, end surface wedging mechanism, end surface engaging mechanism, end surface ratchet mechanism and cylindrical cam mechanism. It may also include a discrete guide mechanism that achieves both axial and radial movements and comprises discrete members such as steel balls, round table/sectional conical roller, diagonal bracing, etc.

Spatial wedging mechanism: a mechanism comprising the rotation guide mechanism and the traction friction mechanism.

Intermediate member: a member that drivably wedges together the other two members, for transferring the torque outwardly into a friction revolving integral body to transfer the torque therebetween, and that is provided with the guide surfaces. It may be a single member or a group of discrete members positioned and pressed within the wedging space formed by said other two members, and it may also be a force-closed single member or a combined assembly provided with wedging spaces itself for enclosing the other two members and being subject to expansion force. The intermediate member is capable to transfer torque outwardly when the mechanism is used as a clutch other than an overrunning clutch.

Wedging: also known as getting wedged, wedged together, wedged, tightly wedged or crammed. It is a working status of the spatial wedging mechanism, and it has the opposite meaning from dewedging/out of wedging/disengaging/releasing. It means that the intermediate member directly or indirectly abutting the two members of the spatial wedging mechanism for transferring the torque outwardly combines drivingly said two members into a revolving integrated connection, with the intermediate member being either within or outside of the two members. Wherein, the later wedging form, namely the two members being integrated from the outside, is a unique feature of the present invention.

Engagement: a general concept of wedging etc. It includes self-locking, locking, or fastening, etc. in the prior art. It has the meaning opposite of disengagement, releasing, overrunning, and it generally refers to a connection of a revolving friction body being combined drivingly from severable mechanisms. For instance, the connection corresponds to a torque transferring status of the overrunning clutch when the spatial wedging mechanism is wedged.

$\zeta$ and $\xi$ : important limit angles in the spatial wedging mechanism, such as an intermediate member 90 shown in FIGS. 1, 4, and 9 (the round depicted by the dash and double dots line represents replaceable round table/sectional conic intermediate member), or an assembled intermediate member 90 including a cup shape housing force limiting member 180 as shown in FIGS. 2, and 5, which on one hand, has at least axially its friction surface 104 against the traction friction surface 72 of the friction member 70, to form a set of traction friction pairs including at least one traction friction pair of the rotation traction friction mechanism F1, wherein the composed forces W along the normal direction at the abutment portion is not perpendicular to the revolving axis X; and which, on another hand, abuts at least axially the corresponding guide surface 54 of the guide member 50 through its friction surface or the guide surface 94 facing the same circumferential direction with the traction friction surface 72 of the friction member 70, to form a set of guide friction pairs including at least one guide friction pair of the rotation guide mechanism G, wherein the composition of forces N along the normal direction at the abutment portion is not perpendicular to the revolving axis X; the average value of the included angle between the common tangent at the abutment portion and the plane perpendicular to the revolving axis X is the lead angle $\lambda$; and further the other hand, acts, through its other surfaces, as other forces (including loading resistance while used as a clutch other than overrunning clutch) such as forces used in the elastic pre-fastening, referring to FIG. 9; in the rotation guide working status of the rotation guide mechanism G, that is in the working status in which the intermediate member 90 is actuated by the guide member 50 to rotate in the direction pointed by the arrow P and at the speed higher than or equal to zero relative to the friction member 70, the minimum lead angle ensuring the frication pairs to be self-locked at the abutment portions of the surfaces of the pairs is defined as $\zeta$ , and the maximum angle of the same is defined as $\xi$. The aforesaid two limit angles define all the possible movements of the rotating forward, staying still, and rotating backward of the intermediate member 90 with respect to the guide member 50. The specific meanings are as follows:

1. when $\xi < \mu \leq 90°$, the traction friction pair and the traction friction pair are unable to be self-locked. The intermediate member 90 may be forced to slide or be extruded forward or in the direction pointed by the arrow P by the guide member 50 via the normal pressure N or its component force Q and T. Therefore, the guide member 50 and the friction member 70 are unable to be wedged into a friction integral body by the intermediate member 90. The intermediate member 90 is frictionally slid relative to the friction member 70, but not actually forced out by the guide member 50 only because the guide member 50 and the intermediate member 90 are axially restricted.

2. when $\zeta < \mu \leq \xi$ and $\mu > 0$, the guide friction pair is at constantly self-locked state, and the traction friction pair is at a general static friction state not being able to be self-locked. Then, as to torque, the magnitude of the traction friction torque of the traction friction pair only relates to and adaptively equal to the acting torque between the guide member 50 and the intermediate member 90, and is irrelevant to any torque on the friction member 70. That is, the torque exerted on the friction member 70 from outside may be large enough to overload relative to the traction friction torque. Therefore, although the intermediate member 90 may cause the guide member 50 and the friction member 70 to be wedged into a friction rotation body, the traction friction pair may still enter a smoothly sliding friction status from the static friction status and the guide friction pair may still be self-locked stably when the friction member 70 is overloaded relative to the guide member 50. Correspondingly, the spatial wedging mechanism is as semi-wedging state, and the overrunning clutch is not in a fully engaged state.

The planar wedging mechanism in the prior art corresponds to the present situation, wherein $\zeta \approx 0$ (the static friction coefficients of the two friction pairs are close to 0.1), $\xi \approx 11°, \lambda \approx 6° \sim 8°, \zeta < \lambda \leq \xi$ . It can be seen that, the physical essence of the working theory/torque transferring is the friction itself, which is not the friction self-locking of two sets of friction pairs as so understood as the preconception of the prior art. Therefore, it is normal for the friction pairs to slide, while being overloaded, and thus, the assumption that the self-locking of the traction friction pair will fail when non-structure distortion/damage happens as so considered by the technical preconception does not exist. Additionally, the structure characteristic that the friction coefficient of the traction friction pair (equivalent weight) is difficult to be increased in the prior art determines that it is impossible to have the movement as indicated in "3" below.

3. when $0 < \mu \leq \zeta$ (corresponding to the condition that $\zeta > 0$), the traction friction pair is at a constantly self-locking state, the guide friction pair is at a normal static friction state. Contrary to condition "2", while the friction 70 is overloaded relative to the guide member 50, the intermediate member 90 has a tendency of sliding over to climb relative to the guide member 50 by overcoming the maximum static friction state/resistance of the guide friction pair. However, because the climbing tendency is rigidly prevented by the axial force-closed structure of the wedging mechanism, the traction friction pair is forced to be maintained at a normal static friction state which equals to the self-locking state. That is, all three of the intermediate member 90, the guide member 50 and the friction member 70 are enforcedly combined into a friction rotation body, such that there is no relatively slide-climbing even if it is overloaded until being damaged. Thus, the spatial wedging mechanism is at an absolutely self-locking/wedging state as a diagonal bracing overrunning clutch. Apparently, the limit angle $\zeta$ is not recognized by the technical theory of the prior art, and is not inspired, conceived, or revealed from the movement relationship of a planar wedging mechanism, and further it cannot be derived from its structure. Therefore, merely in view of the prior art, without understanding of the limit angle $\zeta$ as well as its physical implications, people cannot thoroughly understand the real physical meaning of the limit angle $\xi$, i.e. the wedging angle, and its physical meanings including normality of frictionally slide. Accordingly, the physical essence of circumferentially wedging is impossible to be disclosed, revealed and proved in the prior art.

Theoretically, only when $\lambda$ is equal to $\zeta$ , the guide friction pair and the traction friction pair may be at self-locking state at the same time. However, practically, the critical state of simultaneous self-locking as well as corresponding wedging state do not exist at all, because the critical state of $\lambda = \zeta$ cannot be maintained in practice. Firstly, there are always some clearances in manufacturing, such that the equality cannot be ensured; secondly and importantly, $\zeta$ itself is not constant, and it may vary to certain extent according to the friction coefficient affected by complex and inconstant factors and various corresponding force bearing condition.

Therefore, being different from the diagonal bracing overrunning clutch, in which the radial inner and outer friction pairs are self-locked simultaneously, the physical essence for transferring torque in the spatial wedging mechanism including planar type as a special example is the friction rather than the frictional self-locking. Because there is always a set of friction pairs being capable of sliding without being self-locked in such a mechanism, the terms used for describing the two status should be wedging/wedging together/jamming/wedging angle or dewedging/out of wedging/dis-jamming/releasing and so on, and the terms should not be self-locking/locking/locking tight/self-locking characteristic/self-locking angle or unlocking incorrectly as used in the prior art. Consequentially, the physical essence for transferring torque in a planar wedging mechanism (the condition of $0<\lambda\leq\zeta$ is not possible) as a special example of the spatial wedging mechanism can only be friction but not any self-locking of traction friction pairs as so considered by preconception of prior art. Pursuing simultaneously self-locking of two friction pairs of the mechanism or reliable self-locking of the mechanism is just waste of time on the basis of such preconception.

Apparently, the lead angle $\lambda$, which is also called wedging angle/jamming angle, is the wedging angle of the spatial wedging mechanism of the present invention. Only when $0<\lambda\leq\xi$, the spatial wedging mechanism wedges, and the overrunning clutch engages.

Overrunning rotation and counter-overrunning rotation: they are both rotation of the rotation members at the downstream of the torque transferring passage relative to the rotation members at the upstream of the torque transferring passage, wherein the relative rotation direction of the former is consistent with the direction of the circumferential force to be transferred by the overrunning clutch, and the direction of the latter is opposite to the direction of the circumferential force to be transferred by the overrunning clutch. The circumferential angle rotated by counter-overrunning movement is called slippage angle, idle rotation angle or engaging angle.

The overrunning clutch according to the present invention has advantages of reliable wedging, great bearing capacity, high rotation speed, long work lifespan, good overrunning characteristic, light releasing and engaging, high sensitivity of releasing and engaging, easy to adjust and maintain, high efficiency, stable performance while releasing and engaging in high frequency, simple structure, easy manufacturing and assembly, low cost, and convenient control, conveniently obtaining working state of coupler and sliding device, and wide application field and so on. The purpose and advantages of the present invention are more clear and obvious with the aid of the following specification and figures.

BRIEF DESCRIPTION OF THE DRAWINGS

FIG. 1 is a simplified axial sectional view of one-way overrunning clutch bearing extruding pressure according to the present invention.

FIG. 2 is a simplified axial sectional view of one-way overrunning clutch bearing expanding pressure according to the present invention.

FIG. 3 illustrates an intermediate member shown in FIG. 1, wherein (a) is an axial semi-sectional view of the right elevation view of the intermediate member, and (b) is the front view thereof.

FIG. 4 is a partially enlarged view of the tooth profile of the corresponding mechanisms of FIG. 1 projecting radially on the same outer cylindrical surface.

FIG. 5 is a partially enlarged view of the tooth profile of the corresponding mechanisms in FIG. 2, projecting radially on the same outer cylindrical surface.

FIG. 6 is an axial sectional view of a force-closed one-way overrunning clutch in the simplest structure according to the present invention.

FIG. 7 is a view of an end surface of a friction member in a bag shape package housing friction member with the force-closed function in FIG. 6.

FIG. 8 is a simplified axial sectional view of a one-way overrunning clutch in the simplest structure according to the present invention.

FIG. 19 is a simplified axial sectional view of an embodiment of a wheel hub of an electric bicycle according to present invention.

FIG. 20 is a simplified axial sectional view of an embodiment of an electric actuating overrunning clutch of a motorcycle according to present invention.

DETAILED DESCRIPTION OF THE INVENTION

Figure 10:
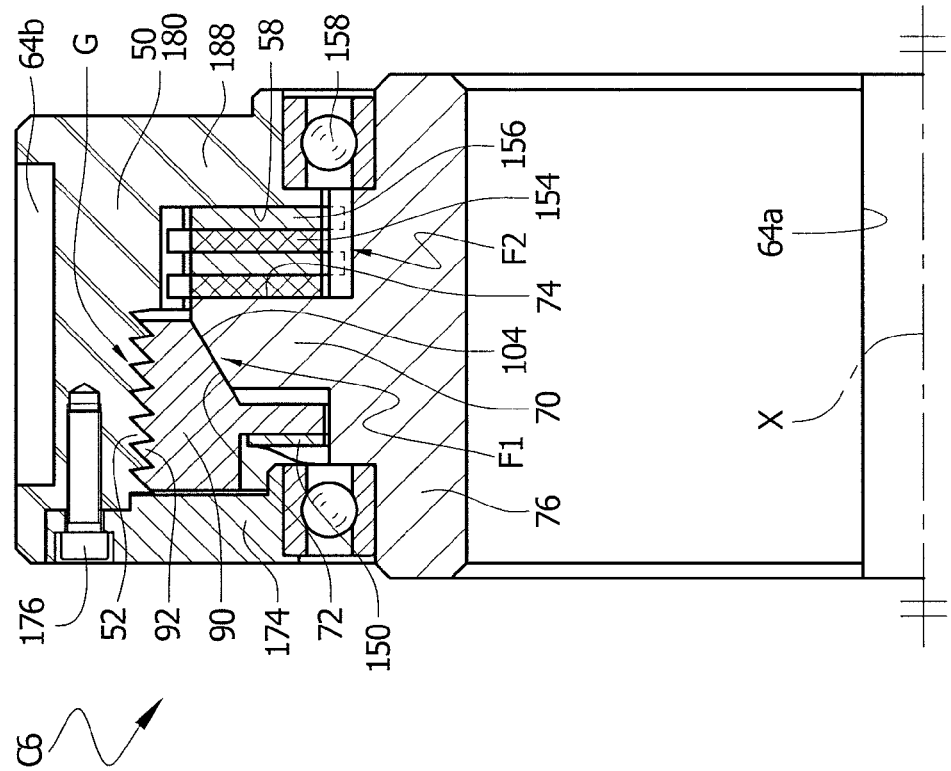
FIG. 10 is a simplified axial sectional view of one-way overrunning clutch with multiple friction pieces according to present invention.

It should be noted that: in the content of the specification and the appended drawings, similar or like components and characteristic members are indicated by the same reference sign, and are explained only when they first appear in the specification. Likewise, the same or similar operations and/or processes would be discussed only once. To differentiate the similar components or characteristic members positioned symmetrically or correspondingly, letters are added after the respective reference signs. Otherwise, no letter will be added if the components or characteristic members are generally referred to, without differentiating from one another.

Example One

A Wheel-Shaft Transmission One-Way Overrunning Clutch C1 Having an Axially Engaged Enclosing Casing According to FIG. 1, 3-4, the one-way overrunning clutch C1 includes a friction member 70, which is rigidly integrated with a tubular body 76 and rotates about an axis line X. The friction member 70 is preferably designed as a dish-like circle annular having a rotating traction friction surface 72 and a force transferring friction surface 74. The inner circumferential surface of the tubular body 76 is provided with a member, such as a key seat 64, for connecting with a drive shaft (not-shown). The tubular body 76 is encircled by an intermediate member 90 which is preferably in an annular shape (as seen in FIG. 2). The outer circumferential surface 108 of the intermediate member 90 is radially positioned on the inner circumference of a force-limiting member 180, and may rotate slidingly relative to the force-limiting member 180. On one hand, the rotating friction surface 104 on the end surface of the intermediate member 90 without tooth is frictionally connected with the traction friction surface 72 of the friction member 70, thereby, through the surface contacting with the friction member 70, constituting a guiding friction mechanism F1. On the other hand, a set of helical guiding teeth 92 preferably circumferentially arranged on the other end surface of the intermediate member 90 with even spacing are constantly engaged with a preferably annular shaped guide member 50 with helical guiding teeth 52 having a complementary structure on the inner end surface thereof, thereby forming a surface contacting one-way rotation guide mechanism G. The rotation guide mechanism G and the traction friction mechanism F1 are together to form a spatial wedging mechanism of the one-way overrunning clutch C1.

The cup-shape housing type force-limiting member 180 with a central aperture is secured with the guide member 50 by screws 176 and washers 186 to form an axial force-closed assembled component. The assembled component is radially positioned at the outer circumferential surface of both ends of the tubular body 76. The intermediate member 90 and the friction member 70 are axially enclosed in the plate shape circular recess of the assembled component to form an axial force-closed system. Meanwhile, a force transferring friction surface 58 of the inner end surface of the annular radial flange force-limiting end portion 188 at the bottom of the cup-shape member 180 is frictionally contacted with the force transferring friction surface 74, thereby forming into a rotation surface contacting force transfer friction mechanism F2 which transfers the friction torque directly with the friction member 70. For transferring torque with the outside components, the outer surface of the assembled component may be provided with curved surfaces (not shown), such as a keyseat, a circumferential belt recess, an annular radial flange friction piece mounting hub, gear teeth, or end surface screw holes etc.

Apparently, the connecting and fastening means may be selected from the group consisting of any of the rivet joint, welding, interference fit, bolt, screw thread pair being capable of frictionally self-locking between the corresponding inner and outer circumferential surfaces and rotating in the same direction as the rotation guide mechanism G, clip ring, pin, key, telescoping or wedging means. Whilst the guide member 50 as shown in FIG. 10 itself is provided with a special structure as a force-limiting end 188, and thus, there is no need of any other connection since the guide member 50 itself serves as a force-limiting member. In addition, the guide member 50 may be attached to and circumferentially secured to the inner circumferential surface of the force-limiting member 180 by splines, and then, the axial outer screw thread of the guide member 50 is connected to the annular end cap of the force-limiting member 180 to provide an axial supporting and one-way limiting connection. Therefore, the aim of the axial force closure of the clutch C1 is achieved.

FIG. 3-4 show the detailed relationship and structure of rotation guide mechanism G and intermediate member 90. Wherein, each pair of helical guide teeth 52 and 92 extends radially. Their respective opposing guide surfaces 54 and 94 are configured as helical tooth flanks in a complementary manner toward a single circumferential direction and both having a lead angle $\lambda$. The guide surfaces 54 and 94 are circumferentially pressed against each other to form a set of helical guide friction pairs, wherein, $0<\lambda\leq\xi$. Preferably, non-guiding surfaces 56 and 96 with clearance therein are parallel with the axis X, to ensure that the circumferential contacts of those surfaces would not result in wedging. The guiding teeth 92 further includes teeth top surfaces 98 and teeth bottom surfaces 102.

Apparently, a plurality of guiding teeth 52 on the end surface of the guide member 50 are actually the wedging teeth of the spatial wedging mechanism. The guiding surfaces 54 of the aforesaid guiding teeth 52 approach circumferentially along the axis toward the revolving traction friction surface 72 of the friction member 70, thereby forming a plurality of end surface wedging spaces extending along the circumference therein. The plurality of guiding teeth 92 provided within the wedging spaces are wedges, which are integrated into the annular intermediate member 90.

In order to maintain perfectly the tendency of the guiding surfaces 54 and 94 rotating circumferentially with respect to each other at all time, namely always maintaining the tendency of rotation guiding of the rotation guide mechanism G, the elastic keeping mechanism is actually a torsion spring 150 provided in the inner hole of the rotation guide mechanism G, and a radial hole 112 formed in the inner circumferential surface 106 of the intermediate member 90 and a corresponding radial hole formed in the inner circumferential surface of the guide member 50 to accommodate the both ends of said torsion spring 150. Then, the intermediate member 90 is retained at the pre-wedge position located at the minimum end along the circumferential direction of the wedge space, such that the intermediate member 90 is about to be wedged anytime. The guide surface 94 and the rotating friction surface 104 are elastically pressed against the guide surface 54 and the traction friction surface 72 as the wedging surface of the spatial wedging mechanism all the time. In the above critical state, the maximum radial clearance of the rotation guide mechanism G is $\delta$, and the maximum circumferential clearance/degree of freedom is $\epsilon$, both of the above two values are preferably greater than zero.

The working process of the one-way overrunning clutch C1 is very simple. At the initial instant when the guide member 50 tends to rotate relative to the friction member 70 in the direction of the arrow P in FIG. 4, the friction member 70 may pull the intermediate member 90 of the rotation guide mechanism G to conduct rotation guiding movement relative to the guide member 50 as indicated by arrow R with the help of zero load/traction friction torque of the traction friction mechanism F1. The axial movement/expansive force generated by the rotation guiding movement of the mechanism G wedges the guide teeth 92 in the end surface wedging space enclosed by the guide surface 54 and the traction friction surface 72 immediately, that is the intermediate member 90 wedges and combines the guide member 50 and the friction member 70 into a friction body. Then, while the traction friction mechanism F1 is axially engaged, the friction member 70 is expanded immediately against the force transfer friction surface 58, which is the inner surface of the force-limiting member 180, to form the axial force closure abutment connection which leads to the engagement of the force transfer friction mechanism F2. Thus, the guide member 50 is directly coupled with the friction member 70 to form a friction body.

And then, the overrunning clutch C1 is engaged following the engagement of the spatial wedging mechanism. The driving torque $M_0$ input from the characteristic surface of the force-limiting member 180 is divided into a wedging friction torque $M_1$ which is transferred through the rotation guide mechanism G and the traction friction mechanism F1, and a force-transferring friction torque $M_2$ which is directly transferred via the force-transferring friction mechanism F2, and then they are delivered to the friction member 70 respectively. After that, the torque is transferred through the tubular body 76 to the drive shaft circumferentially secured within the inner hole of the tubular body 76. Here, $M_0=M_1+M_2$. Certainly, the torque may be transferred reversely without any substantial difference.

At the initial/zero instant when the guide member 50 starts to have the tendency to rotate continuously in relation to the friction member 70 following the direction of arrow R in FIG. 4, the guide member 50 is about to rotate in relation to the intermediate member 90 for releasing the guiding of the rotation guide mechanism G Therefore, the pressure along the normal direction between the guide surfaces 54 and 94 as well as the rotation guiding action of the rotation guide mechanism G would be simultaneously eliminated at the moment that the tendency of the disengagement of the two guide surfaces from each other occurs. Naturally, the friction mechanisms F1 and F2 as well as the spatial wedging mechanism based on the axial movement/expansive force of the mechanism G would then be disengaged or released from wedging. Then, the clutch C1 would be disengaged and start the overrunning rotation, wherein the intermediate member 90 would frictionally slip relative to the friction member 70 following the guide member 50. Actually, with the effect of the spring 150, the intermediate member 90 would be retained at the pre-wedging position stably to prepare for the fast wedging next time.

It should be understand that, the torque would be transferred via a surface contacting pair within the clutch C1. The passage of the torque transfer does not include any discrete or asymmetrical rotation member, as well as any radial force or components thereof relating to the frictional force. There are only an axial component force and a circumferential component force of the cylindrical rotation surface. Both of the above components of the force would act on the members with high rigidity along the axis and/or the circumference. Thus, comparing with the prior art, especially roller type or sprag type overrunning clutch, the one-way overrunning clutch C1 with spatial wedging mechanism according to the present invention not only overcomes the conventional idea and preconception, but also possesses substantive advancement and significant advantages in all aspects, and further possesses almost all features that an ideal overrunning clutch should have.

1. Extremely reliable wedging/self-locking feature. Referring to FIGS. 1 and 4, as to the structure, the wedging state is only relevant to three rigid members of the assembled guide member 50, the intermediate member 90, the friction member 70, especially to the axial rigidity. The assembled guide member 50 with the lowest axial rigidity has two annular inner radial flanges. In addition, the axial span of the guide member 50 is much smaller than the radial span of the member in the prior art, and the guide member 50 has the direct connection with fasteners. Further, the axial force acts on the surfaces other than the discrete spots or lines so that the radial rigidity of the guide member 50 is much higher than the radial rigidity of the completely hollow inner and outer rings in the prior art. Geometrically, the sizes and precisions of the above mentioned three members are common and are easy to be achieved through the design and manufacturing skills in the prior art. Apparently, with the structure of the present invention, there isn't any geometrical or dynamical factors that could dynamically alternate the wedging/lead angle $\lambda$ to affect the wedging reliability. In the actual operation, it is almost not possible for the rotation guide mechanism G to be worn out. The rotation friction surface of the traction friction mechanism F1 is always perpendicular to the axis X due to the natural characteristic of being evenly worn. Therefore, the performance of the clutch C1 can be improved along with the grinding-in/running-in, so that it is totally different from the condition that the grinding-in/running-in does not exist in the prior art. Within the entire life circle of the clutch, the wedging/lead angle $\lambda$ would remain unchanged. Even though the value of $\xi$ may vary due to the change of relevant friction coefficient, the variation may be estimated in advance and thus a safe allowance could be given at initial set-up. Therefore, throughout the entire life circle of the clutch C1, the wedging/lead angle $\lambda$ would always be less than the limit angle $\xi$. Furthermore, the quantity of members of the clutch C1 is reduced by times, and there is no small discrete member and kinematic pair. Thus, the clutch C1 according to the present invention may possess very reliable wedging capability and working reliability, so that it has advantages over the structure of the annular hollow ring in the prior art, which suffers from mechanical wear, discrete radial force, and tendency of radial elastic distortion.

It should be pointed that, while $\zeta<\lambda\leq\xi$, if the loading torque is greater than the driving torque, the clutch C1 would still slip or skid. As described in the present specification, said skid is not because of the failure or destruction of the friction self-locking as the conventional view of the prior art. Said skid is a normal sliding and rotating status when the value of the lead angle is within the above range, and the clutch C1 would return to a non-sliding status when the overload factor is eliminated. Therefore, the clutch C1 with the aforesaid lead angle may be used as a self-adapting overloading-prevention friction type one-way safe clutch, or as a one-way clutch in a starter. The clutch C1 works in one direction, so the reverse transmission would not result in the above consequence. The driving torque introduced from the friction member 70 is not possible to exceed the total static friction torque of the friction mechanisms F1 and F2, wherein the total static friction torque is equal to the loading torque when the clutch is overloaded, and thus, the clutch would not slide even it is overloaded. Of course, in case $0<\lambda\leq\zeta$ (as to $\zeta>0$), the traction friction mechanism F1 will not skid during the process of frictionally self-locking, even if it is overloaded. As the result of overloading, either the original starter is forced to stop harmfully, or any member or system including the original starter or the working device is damaged. Therefore, usually, this range of lead angles would not be selected. However, as to the power transmission system such as the double-engine helicopter, where the reverse-prevention is an important aspect, and this application may not have any possibility of overloading, said range of lead angles may be preferably adopted.

It should be emphasized that, the present invention includes the technical advantage of increasing the value of the limit angles $\zeta$ and $\xi$, to acquire improved loading capacity, wedging/releasing capacity, reliability, slippage angle, axial force, and surface contact strength of clutch C1 with greater design freedom. For the above purpose, the guiding surfaces 54 and 94 of the rotation guiding mechanism G are configured to be inclined helical tooth flanks, and at least the traction friction surface 72 of the traction friction mechanism F1 is configured to be a conical surface, such that the angle between the guide surfaces 54 and 94 in the axial sectional surface, as well as the angle between the traction friction surface 72 and the axis X are not 90 degree, but equal to the other values within 0-180 degree as illustrated in FIGS. 8-10, and 15-19. In addition, the traction friction mechanism F1 is configured as a structure containing a plurality of friction pieces shown in FIG. 11; wherein the guide surfaces 54 and 94 are spaced apart by conic roller/ball bearing/drum roller bearing; and material/element with greater coefficient of friction are attached to at least one of the friction surfaces 72 and 104. For example, while the statistic friction coefficient is 0.1, and the elastic pre-stressed force is ignored, the values of $\zeta$ and $\xi$ of the clutch C1 are equal to 0 and 11.4 degree respectively (identical with the planar wedging mechanism of the prior art). The above limit angles may be increased to 11.0 degree and 22.4 degree respectively, as long as the traction friction mechanism F1 is configured to be a two-piece type friction mechanism. It should be understood that, the limit angles $\zeta$ and $\xi$ are defined and explained clearly in the present specification, such that those skilled in the art may conclude the function relationship/equation without any inventive work.

Figure 11:
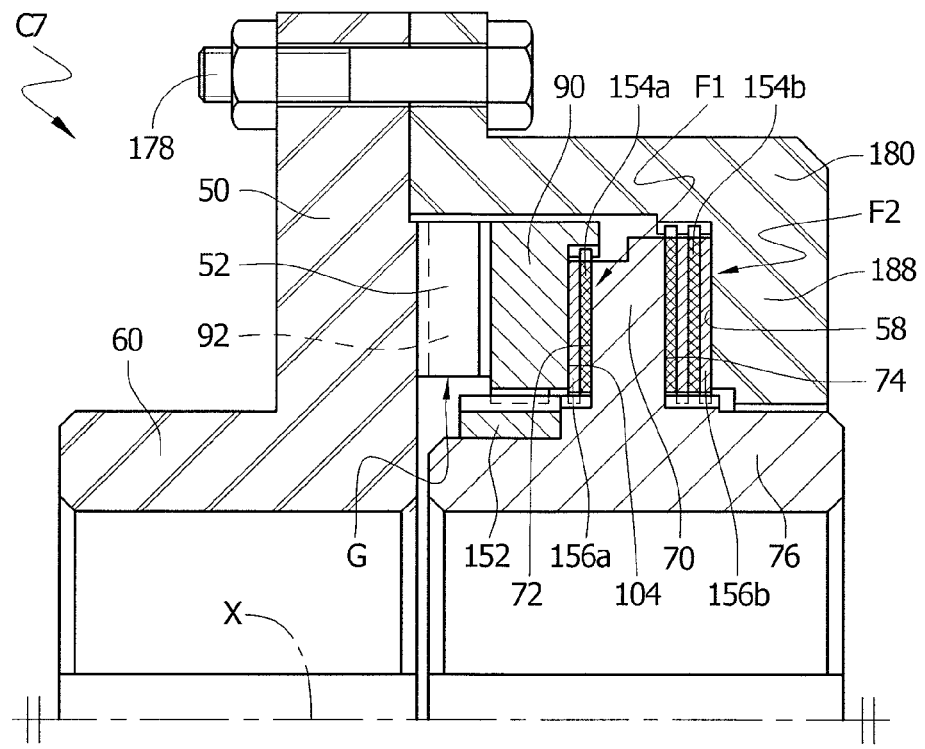
FIG. 11 is a simplified axial sectional view of one-way overrunning clutch with large wedging angle according to present invention.
Figure 15:
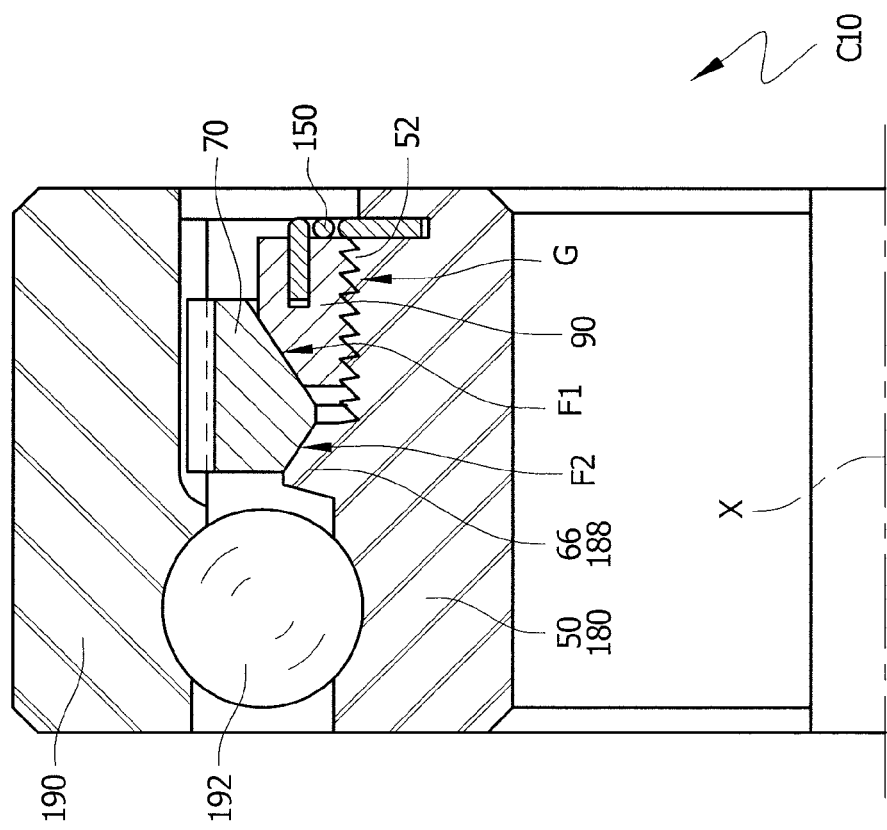
FIG. 15 is a simplified axial sectional view of an embodiment of a one-way bearing according to the present invention.

2. Incomparable bearing capability equal to the driving torque within the acceptable range of the strength of the axial force closure structure. Firstly, because all the torque transferring kinematic pairs of the clutch C1 are fully surface contacting friction pairs evenly bearing force along its circumference. Secondly, the clutch C1 is a two-torque flow transmission mechanism, which further contains a force transferring friction mechanism F2 for directly transferring torque as compared with the prior art, in the condition that the wedging friction torque $M_1$ is already very large. Thirdly, the friction mechanism F1 and F2 may have a structure of a plurality of friction pieces as shown in FIGS. 10-11, or are attached with a structure containing material/element with greater friction coefficient, or is a frusto-conic surface pairs with the semi-conical vertex angle between 0-180 degree as shown in FIG. 15. Therefore, given the same external diameter of the clutch or the same rotation friction external diameter, the torque transferring capability of the clutch C1 could be at least double or ten times larger than that of the prior art. On the other hand, given the same bearing capability, the external dimension is much smaller, such that the clutch of the present invention possesses greater design freedom and capability to fulfill the practical requirements. Here, according to experience, the quantity of the dry and wet friction pieces could be 10 and 30 respectively at most. Thus, the potential of the bearing capacity of the clutch is huge, and the clutch may acquire bearing capacity not less than the limit bearing capacity of the corresponding driving shaft or driving wheel comparing with the relatively small external diameter. Said bearing capacity of the clutch may exceed the bearing limit of one million Newton meter in the prior art. Apparently, the clutch C1 may distribute the torque flow into a wedging friction torque $M_1$ and a force transferring friction torque $M_2$ in any proportion, such as $M_1$ is 20% of $M_2$. Accordingly, said technical method could resolve the confliction between increasing the bearing capacity and reducing the contacting strength of the guiding surface on the basis of the low pair. Thus, the two torque flow transmission of the clutch C1 has the feature of a "power amplifier".

3. Incomparable rotation rate or power transmission advantage. The structural advantages of the present invention are as follows: the main members do not have non-zero centrifugal force; the friction torque or the resistance torque of the traction friction mechanism F1 and the force transferring friction mechanism F2 are not related to the rotation rate; and in addition, the friction resistance torque, when the clutch is overrunning, could be reduced by controlling the strength of the spring 150. Thus, the clutch C1 could transfer a torque much greater than that of the prior art at the rotation rate much higher than that of the prior art. Additionally, the high rotation rate almost depends only on the strength of relevant materials. That is very good for transferring ultra high rotation rate power in such as twin engine helicopter. As for the clutch C3, only balance weight is needed.

Further, it is should be known to those skilled in the art that a steel ball inclined surface centrifugal mechanism may be arranged between the intermediate member 90 and the inner circumference of the force limiting member 180, to realize non-contacting overrunning rotation of the clutch C1. For example, a steel ball received in a corresponding radial aperture of the external circumferential surface 108 of the intermediate member 90 may use the centrifugal force thereof, and press the corresponding inclined surface on the inner circumferential surface of the force limiting member 180 when the overrunning rotation rate is greater than a setting rotation rate, such that the axial force of the spring 150 may be overcome with the help of the axial component force of the counterforce of the inclined surface, and the intermediate member 90 is pressed to disengage from the friction member 70, or at least the contacting pressure between the above two members equals zero. On the other hand, in the transmission application having such as a dual power driving system with predictable long term overrunning condition, an actuate mechanism including such as the directional ring 120 in FIG. 12 may be attached to the guide member 50 or the force limiting member 180 to directly pull or push the intermediate member 90 away from the traction friction surface 72 along the axial direction.

4. Operation life much longer than that of the prior art. At first, there isn't asynchronous friction contact between the respective guiding teeth in the rotation guiding mechanism G, nor any wearing and tearing that would affect the lifetime and capability of the clutch. So the traction friction mechanism F1 and the force transferring friction mechanism F2 naturally possess the ability of self-adapting compensation of wearing and tearing. Then, the friction intensity of the surface contacting is much lower than that of the line contacting under the equal force. In addition, the friction forces of the friction mechanism F1 and F2 are isolated from the centrifugal force. Also, it should be fine if the torque of the spring 150 of the clutch C1 is above zero. Additionally, the clutch C1 has a very good anti-impact ability.

5. Excellent overrunning characteristics. As described above, being benefit from the structure which is not related to the centrifugal force, the overrunning of the clutch C1 is quiet, and the idle friction resistance, the mechanical wearing and corresponding heat generation are all very minor. There isn't any problem of impact or fatigue failure of the spring 150. It is superior to the same of the prior art, including the requirement of lubricant oil and so on.

6. Easy engaging and disengaging characteristics, that is, easy to wedging and releasing. It is apparent from the structure. The engaging process of clutch C1 is very easy, as it can be done only through the friction traction of the traction friction mechanism F1 or the damp intermediate member 90. According to the previous description, the engaging/releasing process is very light and fast comparing with the prior art. There is no waiting until the elastic deformation is restored to release the wedging, and no need to move any inertial mass. It is impossible to have any difficulty in releasing from the wedging or releasing abruptly as in the prior art.

7. Excellent wedging and releasing sensitivity and transmission precision. Because of the high axial rigidity of the structure and the arrangement of elastic keeping or retaining mechanism, the intermediate member 90 could be retained at the position to be wedged. The wedging or releasing of the spatial wedging mechanism does not need any perceivable geometric movement of the intermediate member 90, that is, there isn't any inertial mass within the clutch C1. Therefore, said mechanism has a high responsivity of releasing or wedging at the very first timing in response to overrunning or counter overrunning rotation. The clutch C1 has high sensitivity of disengaging/releasing and engaging, and is fast during disengaging and engaging action. The axial and circumferential rigidity is high, or the axial and circumferential elastic deformation is much smaller than the radial elastic deformation, and therefore, the difference between the wedging position of the intermediate member 90 and the pre-wedging position of the intermediate member 90 before wedging is much smaller than that of the prior art. In comparison with the prior art, the clutch C1 has a smaller slippage angle or higher engagement sensitivity. Said slippage angle is close to zero theoretically and practically. Further, the high precision transmission would be realized and maintained with ultra low wearing intensity. Said high precision transmission includes the overrunning in response of very small circumferential swing (such as the condition of approximately zero rotation rate output in a pulsation continuously variable transmission).

Referring to FIGS. 1, 3 and 4, the present embodiment could also define rigidly the theoretic maximum slippage angle by controlling the circumferential clearance $\epsilon$ between the guide teeth 52 and 92 in addition to the spring 150. Even though the rotation radius is very small, the slippage angle could be efficiently defined as controlling the precision of the geometric dimension. In the current design, manufacture and assembly techniques, it is easy to realize the circumferential clearance $\epsilon$ based on entirely rigid geometric dimension. For example, the value of the circumferential clearance $\epsilon$ could reach the level of 0.001~0.01~0.1 millimeter easily. Such a level corresponds to a circumferential angle 10.3 second~1.7 minute~17.2 minute of a 40 millimeter external diameter. In the prior art, the slippage angle corresponding to a 65 millimeter external diameter has reached 2 degree, and the slippage angle corresponding to a 200 millimeter external diameter is as much as 30 minute. Obviously, in the prior art, the circumferential elastic restraining mode depending on the pre-stressing of a spring may cost too much in order to reduce the slippage angle for realizing high precision transmission, thereby resulting in greater wearing and tearing and shorter life circle due to the increased elastic pre-stressing force. Such conditions would not exist in the present invention. Accordingly, the clutch C1 is more suitable to complete the high precision transmission such as in color printing. The transmission capability could be retained for much longer time because of the ultra low wearing intensity. If a set of end face helical guide teeth 52, 92 is preferably arranged with zero clearance between the teeth, circumferentially extending along the corresponding inner and outer circumferential surfaces as show in FIG. 10 in the form of single or plural threads, with a preferable setting of a torsion spring 150, the transmission ability with high precision within the full life circle would be maintained constantly without any adjustment or special maintenance.

In addition, according to common sense, radial, circumferential and axial passage may be formed on both friction surfaces of the rotation friction pairs of said friction mechanism F1 and F2 or inside relevant elements, such as the friction member 70 and the intermediate member 92 at the same time or respectively, such that the gas or liquid passing through could take way heat generated from the friction, and could quickly enter and leave respective friction surfaces to ensure the releasing and engaging sensitivity of the clutch C1.

8. Stability of high frequent releasing and engagement. As described above, because the circumferential clearance $\epsilon$ could be easily controlled, good responsivity of the clutch C1 is ensured. That is, no matter how high the frequency of the releasing and engagement is in theory and/or in practice, the clutch C1 could acquire any high responsivity as required (synchronous may be realized theoretically). The inertia impact/rotate rate differences of the rotation guiding mechanism G could be reduced approximately to zero, and the stability of the clutch could be maintained even during a long time operation. There would not be any excessive wearing and severe heating due to the wedging and releasing/disengaging as in prior art. It is impossible for the spring 150 to break up or wear out. Even if the guide member 50 instead of the friction member 70 is used as the torque input mechanism, the clutch C1 could easily work under 2000 rotation/minute of engaging and releasing operation in the pulse continuously variable transmission. The upper limit of the torque and power of the transmission could be doubly improved.

9. High efficiency. According to the aforesaid low wearing and tearing characteristic, better overrunning characteristic, and gentle engagement and releasing of the clutch of the present invention as compared with the technique in the prior art, it obviously has higher transmission efficiency.

10. Easy to adjust and repair. Benefit from the self-adjusting axial distance ability and no-wearing characteristic of the rotation guiding mechanism G, as well as even friction characteristic on the rotation friction surfaces of the traction friction mechanism F1 and the force-transfer friction mechanism F2, the adjustment of the clutch C1 during use, and exchange after damage or repair after wearing are all simple and easy. The exchange or repair could be processed respectively, and does not have any problems relating to matching or capability. Thus, it is obviously better than the technique of the prior art, in which the whole mechanism should be replaced under the same condition. For example, any member could be replaced independently, and the friction member 70 or the force-limiting member 180 could be repaired by repair welding. Further, through adjustment of the thickness of the washer 186, or through installation of a roller cam adjusting mechanism similar to the guiding mechanism D in FIGS. 12-13 (the circumferential clearance ϵ could be adjusted seamlessly by the transition section), the wearing effect could be counteractive, and the high precision transmission could be maintained, and the life circle of each component could be prolonged.

11. Incomparable structure, technique, and commercial advantages. Apparently, the most complex machining technique required by the simple structure and the dimension and location relationship of the clutch C1 is just helical teeth machining, which is simple and mature in the present manufacturing industry. It should be understood that, due to the simple technique of manufacturing and readiness of assembling, the clutch C1 certainly has higher production efficiency and lower manufacturing cost comparing with the technique of the prior art, especially in the one-way overrunning clutch as shown in FIGS. 10, 15-20, wherein the end surface helical guiding teeth 52, 92 are formed on the corresponding inner and outer circumferential surfaces in the form of single or multiple circumferential continuous helical teeth.

As described in the definition, the present invention does not set specific limit to the rotation guide mechanism G and its end surface guiding teeth 52, 92 specifically. There is no need to contain the preferable helical tooth structure for said mechanism G Therefore, the mechanism G and its guide teeth could be any form or shape capable of rotation guiding. The guiding teeth could either be arranged on the end surface/circumferential surface discretely, or be arranged on the inner/outer circumferential surface continuously along the circumference. In the latter arrangement, it could be helical teeth with sectional shape of rectangle, trapezoid, serration, or triangular. Similarly, the rotation friction surfaces of the friction mechanism F1 and F2 may rotate about any curve/generatrix, only if the surfaces axially engage with each other complementarily.

It needs to be noted that, although it is not essential, the present invention is preferably provided with elastic pre-stressed mechanism/spring 150. The purpose of the above arrangement is to ensure the intermediate member 90 being kept at the pre-wedging position all the time. Therefore, the intermediate member 90 could respond to the change of relative rotation direction of the clutch while having a constant traction friction torque. Consequentially, the intermediate member 90 may wedge simultaneously at the very initial time of the counter overrunning rotating, and thus the counter overrunning rotation may be stopped initially and the slippage angle is approximately zero. Accordingly, the spring 150 used in the present invention is not limited to the form of torsion spring, and is not limited to the installation position of an inner hole. There is no limit to the particular shape, quantity, and installation position so long as the purpose is ensured. For example, the pre-stressed element could be elastic member of a torsion spring, a compressed spring, a tension spring, a plate spring, a diaphragm spring, a wave shape spring, a straight steel wire/leaf spring made from any material; and the pre-stressed element could also be mounted at one side of the inner and outer circumferential surfaces, either side of the two end surfaces, or inside of the rotation guide mechanism G The method of having a set of compressed spring or straight steel wire/plate received partially inside a group of axial counter bores in the top surfaces of the guide teeth 52 or 92 respectively would use the least space. Obviously, as shown in FIGS. 1, 3-4, a torsion spring or a torsion spring that could be compressed axially is suitable to be used in high precision transmission. The idle/traction friction torque acted on the intermediate member 90 is preferably not great enough to balance the circumferential counterforce of the spring 150 and lead to the disengagement of the guide surfaces 94, and 54. Additionally, the axial force provided by the spring 150 and the corresponding idle/traction friction torque may be small enough, and is almost unrelated to the rotation rate and bearing capacity of the clutch. There isn't obvious variation as to the working condition of the spring 150 during use. Therefore, any ordinary low cost spring could be used as there isn't any other additional requirement.

It should be understood that, the friction member 70 and the tubular body 76 in the clutch C1 could be rigidly formed as an integral member or circumferentially joint with spline (equal to an overrunning clutch without inner ring) to self-adjust its axial location, and to ensure that all the axial forces are absolutely enclosed within the assembled guide member 50, such that the bearing 158 would not endure any axial force. Certainly, if a further intermediate member is provided symmetrically between the friction member 70 and force-limiting member 180 along the axial direction, and the helical guide teeth with complementary structure are provided on the force transferring friction surface 58 to form an one-way overrunning clutch having dual traction friction mechanisms F1 and sharing the same friction member 70, and then even if the friction member 70 is rigidly integrated with the tubular body 76, the axial self-adjusting characteristics of the rotation guide mechanism G would ensure that the clutch won't impose any axial pressure on the bearing 158. The releasing/disengaging would be much easier with the two guide surfaces 54 that are symmetric with each other about the axis.

Figure 14:
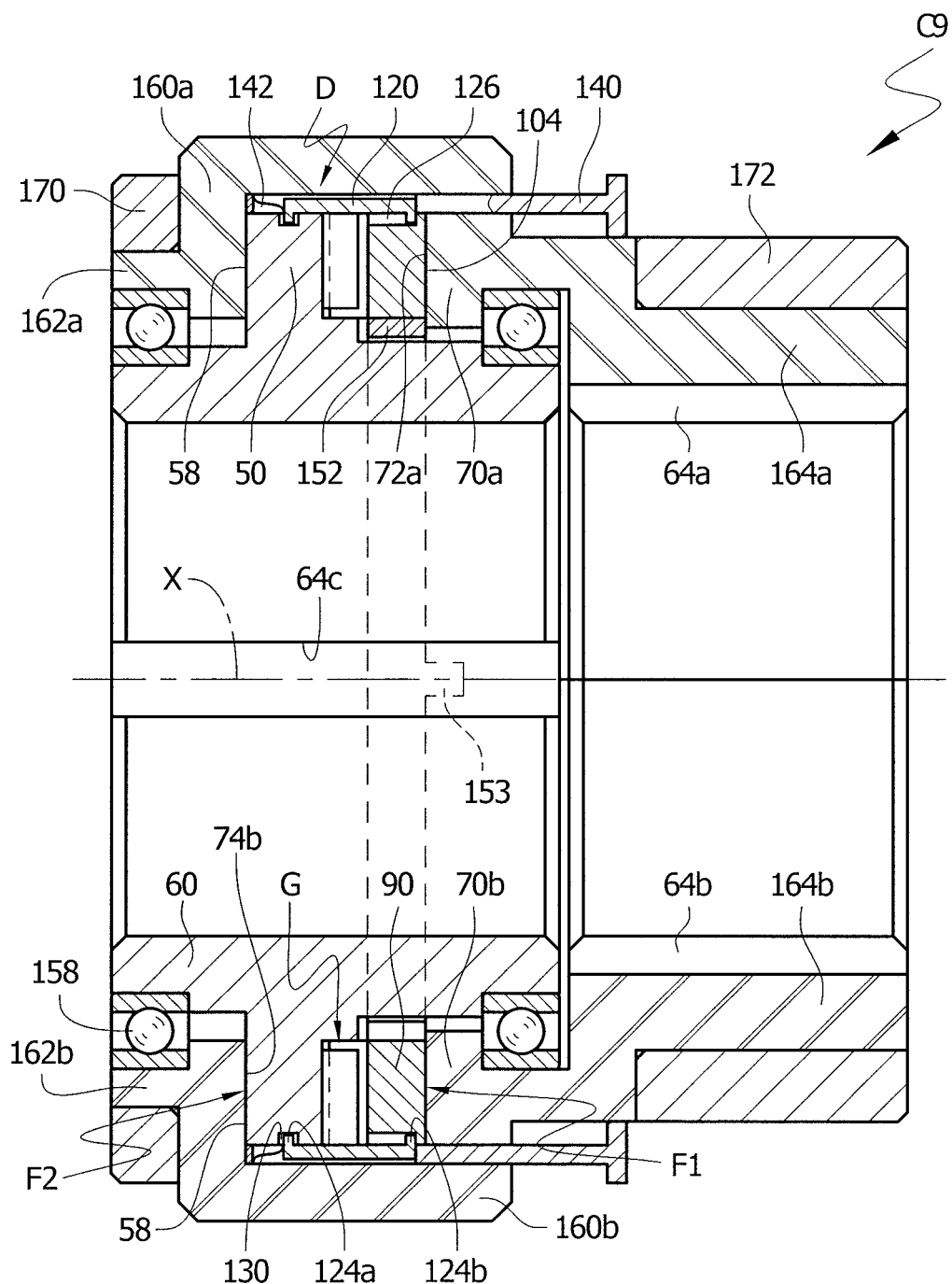
FIG. 14 is an axial sectional view of two-way overrunning clutch which may be used as a slider in motor vehicles.

Referring to FIG. 1, the mechanism G and mechanism F1 in clutch C1 could turnover about the axis. That is, in the transformed clutch after the exchange of the positions, the friction member is a force-closed assembled component including a cup shape force-limiting member 180, and the guide member rigidly integrated with the tubular body 76 forms a force transfer friction mechanism F2 together with the force-limiting member 180. The structure of the above member is as shown in FIG. 14. As described above, in the modified clutch, the two intermediate members being symmetric with each other about the axis could share the same guide member having double end surfaces guide teeth, and thus such a clutch is changed into an axial duplex one-way overrunning clutch. Accordingly, the spatial wedging mechanism is much easier to de-wedge/release.

For the axial force-closing, convenient assembling and repairing, and maintaining the high precision transmission, an axial abutment enclosing case is adopted in the clutch. Actually, as to the field of non-indexing overrunning and backstop transmission shown in FIG. 6, and FIG. 14, the best choice is to use a rigidly integrated bag shape enclosing case or a radial abutment enclosing case.

Referring to FIG. 1, the one-way overrunning clutch C2 as shown in FIG. 2 could be formed by removing the spring 150, and rigidly integrating the tubular body 76 extending above the traction friction surface 72 in the axial direction with the intermediate member 90. Apart from shaft-shaft transmission, the guide member 50 is equipped with tubular body 60; the intermediate member 90 is a force-closed assembled member including a cup shape force limiting member 180; the rotation friction surface 104 is arranged on the inner surface of the force-limiting end 188 and the force transferring friction surface 58 is provided on the end surface without tooth of the guide member 50. Referring to FIG. 5, the most prominent feature of the clutch C2 is the wedging mode and the corresponding force bearing condition, which has changed from the conventional interior wedging mode of the wedging mechanism located within the wedging space and pressed by the force from the outside toward the inside into an exterior wedging mode of the wedging mechanism having a wedging space itself and expanding from the inside toward the outside by the pressing force. Except from the force bearing condition and the corresponding change of the position of the mechanism, for example, the guide member 50 is frictionally connected with the friction member 70 directly, there isn't any substantial difference. Even though the elastic keeping mechanism is removed, the intermediate member 90 no longer directly or indirectly contacts the friction member 70 constantly to perceive the rotation of the friction member 70 and the guide member 50 relative to each other, and the traction friction torque for wedging cannot be obtained; and only the slippage angle is affected. The guide member 50 could still quickly change relative to the rotation direction of the intermediate member 90, such that the intermediate member 90 may wedge by the inertial force to transfer the torque. For instance, the overrunning transmission of the high frequency directional changes in the impulsion stepless transmission is a good example.

As described above, the mechanisms G and F2 in clutch C2 may swap positions axially with each other, that is, the guide teeth 52, 92 are provided between the guide member 50 and the friction member 70. Therefore, the clutch C2 turns into a dual-circumferential or single-circumferential clutch based on the working condition of the force-closed assemble mechanism including the force-limiting member 180. Additionally, the intermediate member 90 of the clutch C2 may be divided into two independent members of an intermediate member and a plane ring. The plane ring is connected with the force-limiting member 180 to form a force-closed assemble mechanism. The friction member 70 still transfers torque toward outside. Certainly, the structure of the clutch is equivalent to that shown in FIG. 14 if the friction member 70 is removed.

It should understand that the elements of the clutch C1-C2 are not all essential to the application of the present invention. For instance, as shown in FIG. 6-7, the non-full circle wedging force-transfer wheel-shaft transmission type one-way overrunning clutch C3 only includes three essential components. Wherein, the exterior surface of the bag shape annular friction member 70 for the axial force-closing is provided with the force transferring features such as key slot 64, gear teeth, screw hole/pin hole or belt groove. The inner circumferential surface 84 of the friction member 70 is provided with a plate shape annular groove 78 in the middle along the axial direction. The inner surface of an exact half circle of the annular groove 78 preferably extends radially to the outer surface of the friction member 70 along two parallel tangent lines H and forms a quadrangle through hole 82. Therefore, the inner circumferential surface 80 of the annular groove 78 is extended to be an inner radial surface with a U-shape cross section. The guide member 50 and the intermediate member 90 engaged with each other may be received in the annular groove 78 along the direction indicated by the hollow arrow via the through hole 82. Apart from the above circumferential inertia force, for the reliable wedging, the outer radius of the intermediate member 90 is slightly larger than that of the guide member 50, such that it could frictionally contact with the inner circumferential surface 80 during the radially movement to acquire the friction force needed for wedging. Consequentially, the inner circumferential surface 84 of the friction member 70 and the splined shaft circumferentially attached in the inner hole of the guide member 50 are provided with a corresponding radial clearance therebetween. The above arrangement is especially suitable for using in a hinge mechanism or one-way/two-way spanner/screwdriver which may work continuously.

Obviously, if the guide member 50 or the intermediate member 90 are directly disposed on an inner end surface of the friction member 70 in FIG. 6, or the direct or indirect circumferential attachment is realized with the help of the U shape outer circumferential surface, splined hub inside the hole, axial/radial pin in the inner surface having complementary configuration and so on, and then a bag shape guide member or an intermediate member with an axial force-closed function can be obtained. While assembling, an intermediate member or guide member may be installed in advance along the radial direction, and then a friction member may be installed after the engagement along the axial direction. Certainly, the bag shape mechanism may be a single force-limiting member, and may be sealed by the ring firmly attached on the outer circumferential surface.

Generally, the clutch C3 may achieve the positioning of elements thereof via the members such as splined shaft through the clutch C3 axially. However, if necessary, the clutch C3 can be enclosed and assembled by the following method during assembly. A circumferential tongue being capable of radially bending inwardly may be cut out in advance at a position on the circumferential end 88 of both radial side surfaces of the through hole 82 and corresponding only to the guide member 50 axially. Alternatively, a radial tongue being capable of axially bending inwardly may be cut out in advance at the radial outer ring side 86 in the center of the inner end surface of the through hole 82 that is coplanar with the force-transfer friction surface 74. Thus, the circumferential tongue or the radial tongue may be plastically bend after the guide member 50 and the intermediate member 90 are assembled in position, to realize the assembly and positioning of said two members.

Actually, the force-transfer friction mechanism F2 is not essential either. Referring to FIG. 8, the three-component overrunning clutch C4 in a shaft-shaft transmission form of inner wedging mode may be supported by two transmission shaft coaxially fastened with the guide member 50 and the friction member 70 respectively, and then an axial force-closed system is formed not by the clutch itself but by the frame. For a reliable wedging, the intermediate member 90 may preferably be an expanding type or contrasting type elastic open ring.

Figure 9:
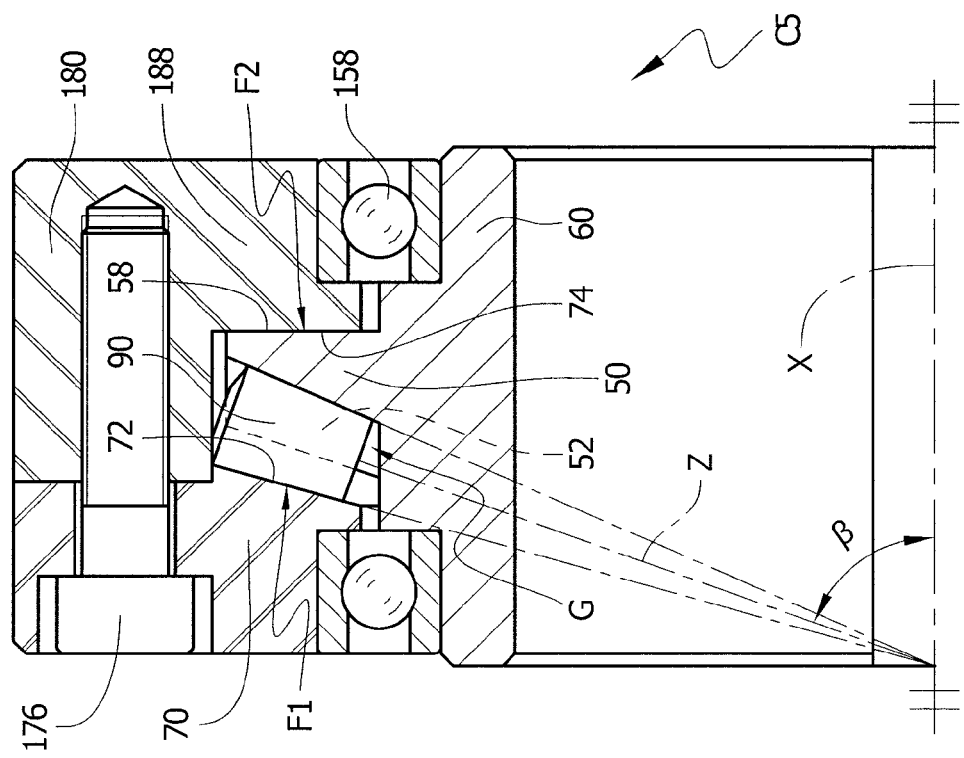
FIG. 9 is a simplified axial sectional view of the deteriorated one-way overrunning clutch according to the present invention.

Further, those skilled in the art should understand that the intermediate member 90 is not necessary to have a full circular shape, and it could be in the form of a plurality of discrete elements as shown in FIG. 9. Therefore, the intermediate member 90 may move axially and radially at the same time and transfer the corresponding action force. The friction member 70 is a force-enclosed assembly member containing a cup-shape casing force-limiting member 180. A plurality of intermediate member 90 such as steel ball or a circular platform/conical rollers located on a conical rotating surface Z having a semi-conic top angle of $\beta$, are correspondingly received in a set of circumferential tooth recesses of conical shape/tapered helical teeth type guide teeth 52 on the end surface of such a cone. The rotation side surface is not only a guide surface but also a friction surface. With the help of the centrifugal force, the intermediate member 90 is pressed against the traction friction surface 72 of inner conical surface type constantly. Thus, the rotation guiding mechanism G and traction friction mechanism F1 of the overrunning clutch C5 are both higher pairs in point/line contact, as referring to the round depicted by the dash and double dots line in F1. Although the clutch C5 is not as good as the clutch C1 in the capability, it is still superior to that in the prior art because of the high axial rigidity and above described advantages of the force transfer friction mechanism F2.

Apparently, the roller type overrunning clutch of the prior art is just a special example when the angle β of the clutch C5 equals to 0 or 180 degree, that is a special example providing the traction friction mechanism F1 with radial, not axial, engaging force. Because of lack of axial movement, the spatial wedging mechanism is simplified into a plane wedging mechanism with only radial movement. The clutches C1-C4, C7-C9 correspond to the condition that their angle β, specifically the semi-conic top angle of the conical rotation surface on which the contacting point/line of the traction friction pair of the mechanism G is equal to 90 degree. The clutches C6, C10-C15 are corresponding to the condition that 0 degree<β<180 degree and β≠90 degree. The intermediate members 90 are preferably united with each other to form a single rigid body/integrity body, because they are not need to move radially or to rotate.

Embodiment Two

One-Way Overrunning Clutch C6, C7 with Multiple Pieces Type Friction Mechanism Comparing FIG. 1 with FIG. 10, it could be found that the overrunning clutch C6 is actually a modification of the clutch C1. Wherein, a set of end surface helical guide teeth 52, 92 of the rotation guide mechanism G are in the form of single thread or multiple threads, and circumferentially continuously formed on the inner circumferential surface of the guide member 50 and the outer circumferential surface of the intermediate member 90. An annular end cap 174 is fastened on the open end surface of the guide member 50 being rigidly integrated with the force-limiting member 180 by bolts 176. The wave shape spring 150 is arranged between the annular end cap 174 and the intermediate member 90, and only the intermediate member 90 is pressed against the friction member 70. Further, the force transfer friction mechanism F2 is configured as a clutch mechanism with multiple friction pieces, such that the torque transferred directly by the force transfer friction mechanism F2 is multiple times of the traction friction mechanism F1. Therefore, a set of relatively small friction pieces 156 including at least one friction piece are circumferentially fastened on the corresponding stepped outer circumferential surface of the tubular body 76 by way of splined connection. Another set of larger friction pieces 154 staggered axially with said friction pieces 156 are fastened on the corresponding stepped outer circumferential surface of the guide member 50 by way of splined connection.

Similar as the clutch C6, the shaft-shaft transmission overrunning clutch C7 in FIG. 11 contains force transfer friction mechanism F2 with multiple friction pieces. To acquire larger limiting angle ξ and ζ for reducing axial force and idle friction torque, the traction friction mechanism F1 also adopts multiple friction-piece structure, containing a set of traction friction pairs with more than one traction friction pair. As a result, when the idle torque of the traction friction mechanism F1 without any action of the elastic axial force reduces approximately to zero, and the functions of the traction friction mechanism F1 for sensing the relative rotating direction and driving the intermediate member 90 into wedging disappear. Accordingly, the elastic keeping mechanism includes a contracting type elastic open ring sensing member 152, which is circumferentially fastened on the inner circumferential surface of the intermediate member 90 by a spline and elastically compressed on the corresponding outer circumferential surface of the tubular body 76 to form a sensing type rotation friction pair. When counter overrunning starts, the intermediate member 90 may still be immediately wedged by the traction friction torque, such that the clutch C7 engages immediately to transfer the torque. Apparently, the above design reduces the wearing and tearing of the traction friction mechanism F1 and the force transfer friction mechanism F2 as well as the overall idle resistance torque. In addition, the fastener used in the assembled guide member 50 is replaced with a screw 178.

It should be understood that the clutches C6, and C7 are preferably used in transferring relatively larger torque, and in a transmission section with low requirement in the precision of transmission, engagement frequency or slippage angle. The purpose of restricting the maximum circumferential clearance ϵ of the transmission guide mechanism G for realizing a high engagement sensitivity and a small slippage angle can be achieved only if at least a circumferential position restricting mechanism, such as a radial or axial pin slot engagement mechanism, is installed between the intermediate member 90 and the guide member 50 or the annular end cap 174. Additionally, the position restricting mechanism may be partially formed with an elastic material or be circumferentially arranged with a spring 150, and thus the above described elastic keeping mechanism is formed actually.

Embodiment Three

Shaft-Shaft Transmission Two-Way Overrunning Clutch C8

Figure 12:
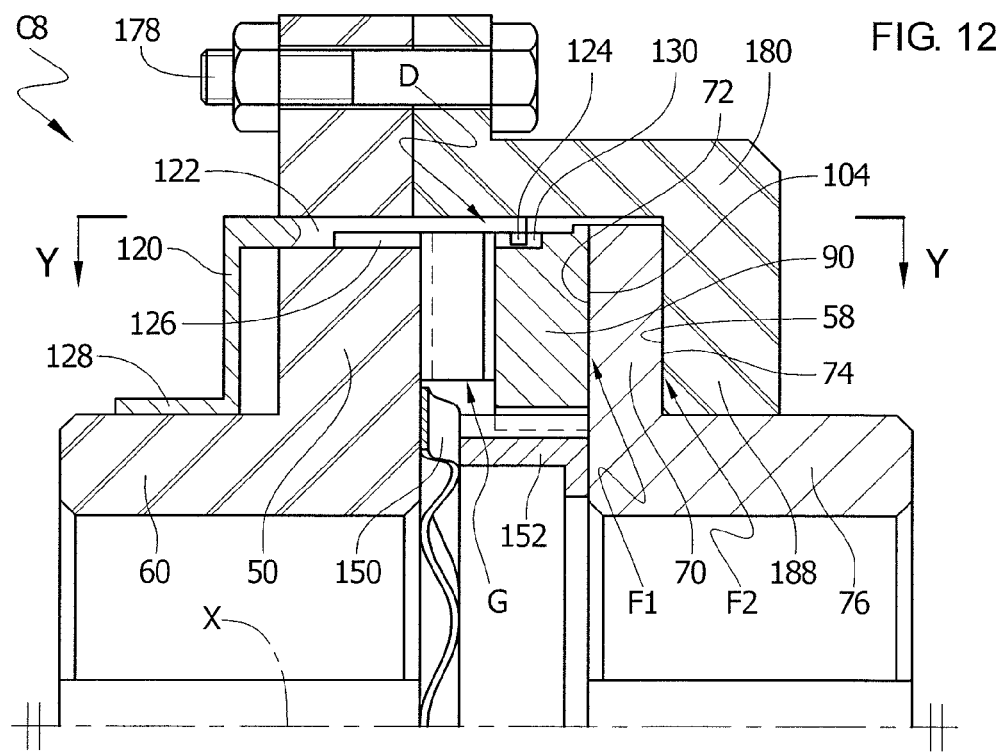
FIG. 12 is a simplified axial sectional view of two-way overrunning clutch according to present invention.

Referring to FIG. 12, the two-way overrunning clutch C8 comprises the main structure of the clutch C7. Different from all of the above embodiments, the elastic keeping mechanism includes two components, which are a wave shape spring 150 and a full ring sensing member 152, which is pressed against the traction friction surface 72 by the spring 150 to form a sensing type rotation friction pair together with the traction friction surface 72. For transferring a torque in both directions, each pair of the helical guide teeth 52, 92 is equipped circumferentially symmetrically with two helical guide surfaces 54, 94, each of which has a lead angle of λ and is complement with each other referring to FIG. 4-5 and FIG. 13(*a*), here, 0<λ≤ξ. An orientation mechanism D is equipped for guiding the working direction of the clutch C8. The main body of the mechanism D is an orientation ring 120, which includes a set of axial orientation pins 122 and a tubular section 128 being capable of covering rotationally and slidably the tubular body 60. A radially inward cylindrical protrusion 124 is provided at the head of the orientation pin 122 and extends through an axial reference hole/slot 126 of the guide member 50, and it may be slidably received in the corresponding guide groove 130 on the outer circumferential surface of the intermediate member 90 from one open end, to form a cylindrical cam type pin-slot engagement mechanism with a circumferential clearance near zero. When the guide surfaces 54 and 94 collide in any circumferential direction, the circumferential degrees of freedom of the orientation ring 120 in both circumferential directions with respect to the guide member 50 are all larger than zero but not larger than the circumferential degree of freedom $\epsilon$ of the rotation guide mechanism G at that time. That is to say, $0<\delta 1<\epsilon$ and $0<\delta 2<\epsilon$, wherein $\delta 1$ is preferably equal to $\delta 2$, referring to FIG. 13(a).

For convenient description, it is assumed that the direction indicated by the arrow P in FIG. 13(a) is the forward direction, which is the counter clockwise rotation direction of the friction member 70 driven by the guide member 50 when being observed from the left side of FIG. 12. Consequentially, the guide groove 130 is an assembly of multiple sections of, including axially a forward section 132 receiving a protrusion 124, a backward section 134 circumferentially separated from said forward section 132 with a circumferential angle $\epsilon$, and a transition section connecting the above two sections. While the working direction of the clutch C8 is forward, that is the torque and overrunning movement are transferred only forwardly, the clutch C8 is equal to the one-way overrunning clutch C1 working in the counterclockwise direction. Because the guide surfaces 54b and 94b are restricted circumferentially by the mechanism D, said surfaces are not possible to collide. Symmetrically, when the protrusion 124 is received in the backward section 134 of the guide groove 130 with the rightward axis movement of the orientation ring 120, the intermediate member 90 would rotate for the angle $\epsilon$ with respect to the guide member 50. Accordingly, the working direction of the clutch C8 would turns into backward from forwarding, and could only transfer torque and overrunning movement in the backward direction. Thus, the clutch C8 is equal to the one-way overrunning clutch C1 working in the clockwise direction. Then, the guide surfaces are not possible to collide.

Apparently, the theory and structure of the orientation mechanism D may be used in stepless control of the circumferential clearance $\epsilon$ of the one-way overrunning clutch for maintaining constantly the transmission precision. The one-way overrunning clutch working in an opposite direction or the one-way overrunning clutch with radial abutment assemble housing as shown in FIG. 14 may be dually connected correspondingly in the way of rigidly integrating or sharing a common orientation mechanism D by a force limiting member, and then a two-way overrunning clutch having the same torque capacity as a one-way overrunning clutch may be obtained.

It should be understood by those skilled in the art that the effect of the orientation mechanism D is to selectively define the circumferential rotation range of the intermediate member 90 with respect to the orientation member 50, and then the abutment of the guide surfaces 54 and 94 about the circumferential direction set in advance may be permitted or prevented, such that the rotation guide mechanism G may or may not guide the rotation in said circumferential direction. Therefore, the clutch C8 is defined as a one-way overrunning clutch in the circumferential direction, to achieve the purpose of restricting and controlling the working direction. Consequentially, there is no need to repeat the working process of transferring torque and overrunning of the one-way clutch C8.

Further, the orientation mechanism D may be provided with different definition or combination of different definitions, to allow or prevent the guide surfaces 54 and 94 from pressing against each other corresponding to 0-2 circumferential direction. Thus, the overrunning clutch which is controllable in its directions comprises all possible orientation status and corresponding working conditions. For example, the guide groove 130 in FIG. 13(a) may be replaced by the guide groove 130 in FIG. 13(b)-(f). FIG. 13(b) is an orientation solution suitable to be used in one-way slider of a motor vehicle or fishing reel of a fishing pole. When the protrusion 124 is axially located within the free section 136 of the guide groove 130, the rotated circumferential angle of the intermediate member 90 relative to the guide member 50 will be larger than $\epsilon$. Accordingly, the guide surfaces 54 and 94 corresponding to two circumferential directions may be pressed against each other without being restricted. The clutch would be a friction coupler overrunning in the zero direction and transferring torque in two directions. Therefore, the above orientation solution used in the power transmission of ships may efficiently prevent the harmful collision to the clutch by the transient separation brought by storm. There is an additional reverse section 134 in FIG. 13(c) than in FIG. 13(b). Such a scheme may be used in a two-way slider of automobile. For reducing the axial distance of direction alternation movement, the radially inward protrusion 124 in FIGS. 13(c)-(f) are changed from a cylinder into a regular octahedron.

By the way, it could be comprehended from the description of the embodiment one, when $\zeta<\lambda\leq\xi$, the clutch would slide when it is overloaded. Therefore, the clutch C8 can have the function of a safe clutch when it is in a coupler working condition. Further, if the orientation mechanism D, the sensing member 152, and the spring 150 in the clutch C8 are removed, the circumferential angle $\epsilon$ is preferably set at zero, and the guide member 50 is coupled with the prime actuator, then the clutch C8 would turns into a two-way friction safety clutch/coupler without idle traveling, wherein the overloading torque is unrelated with the friction coefficient and the clutch is precisely self-adapted to the driving torque. Then, the problem of precisely setting and constantly maintaining the overloading torque would not exist any more. Furthermore, while the clutch of the present invention is used as a coupler, it may have the ability of self-adapting to any eccentric degree to certain extent.

Figure 13:
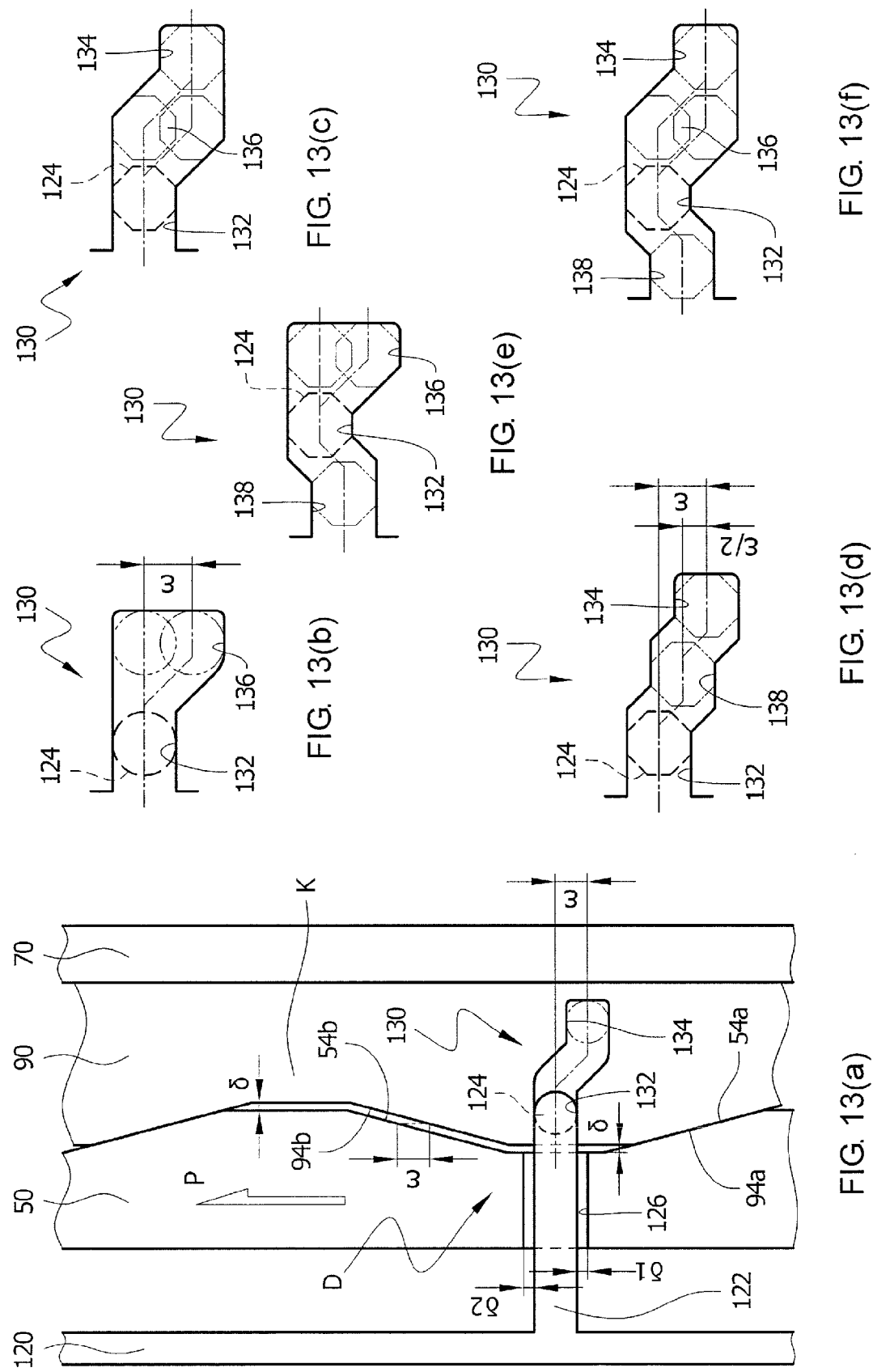
FIG. 13 is a sectional view of the orientation mechanism along the line Y-Y of the cylinder sectional surface of FIG. 12, wherein (a) illustrates the orientation relationship with forward and, backward working condition, the hollow arrow pointing to the front direction of the rotation, (b)-(f) illustrate alternative structures used to replace the guide groove in (a); specifically, (b) corresponds to the forward working condition and working condition of junction box, (c) corresponds to the forward working condition, working condition of the junction box, and reverse working condition, (d) corresponds to the forward working condition, completely separated idle working condition, and reverse working condition, (e) corresponds to the completely separated idle working condition, forward working condition, and working condition of the junction box, (f) corresponds to the completely separated idle working condition, forward working condition, working condition of the junction box, and reverse working condition.

As the improvement to FIG. 13(c), the guide groove 130 in FIG. 13(d) is provided with a neutral section 138 for replacing the free section 136. The neutral section 138 is located circumferentially at the middle position between the forward section 132 and the backward section 134. Correspondingly, the upper limits of $\delta 1$ and $\delta 2$ are needed to be less and $\epsilon/2$. Therefore, when the protrusion 124 is located axially within the neutral section, the orientation mechanism D would cause the guide surfaces 54 and 94 to be unable to be pressed against each other in both circumferential directions. That is to say, the guide surfaces 54 and 94 are pressed against each other in the zero direction. The rotation guide mechanism G will then be at an invalidation condition. Therefore, the clutch would absolutely overrun in the two directions and transfer torque in the zero direction. Thus, the overrunning clutch with the orientation scheme shown in FIG. 13 (d) would be especially suitable in a dual power driving system that would require power switching and online maintenance at any time, and it may be used to replace the SSS synchronous clutch used in large-scale ships as well as power units. However, it is obvious that the orientation scheme shown in FIG. 13(e) would be better suitable to be used in ships because the reverse transmission is rarely employed. After the forward section 132 is removed, the clutch could be used as a stepless orientation hinge. Additionally, while adopting the orientation scheme shown in FIG. 13(*f*), the overrunning clutch with the controllable direction would comprise an absolute separating idle condition, forward condition, coupler condition and backward condition in the simplest manner. Thus, the clutch would fulfill the most complex practical requirements.

As described above, the purpose of providing the orientation mechanism D is to selectively cancel the rotation guide function of the rotation guide mechanism G in zero, one or two circumferential directions, and then define the working direction of the two-way overrunning clutch. Therefore, any rigid/flexible mechanism or device capable of realizing the above function may be used as an orientation mechanism without any other limitation. The orientation mechanism may be mounted radially outside, or inside of the rotation guide mechanism G, or radially in the same position with the rotation guide mechanism G, or at one side of the end surface of the rotation guide mechanism G The orientation mechanism may also include an elastic keeping mechanism, for example, an axial or radial pin-slot engaging mechanism with at least one protrusion and at least one slot. The axial or radial pin-slot engaging mechanism is provided between the intermediate member 90 and the guide member 50, or between the force-limiting members 180 or the rotating shafts circumferentially integrally rotating with the above two members respectively. It is a good choice to adopt the engaging method using the eccentric pin and eccentric slot capable of rotating, and furthermore, it is convenient to install any kinds of springs to elastically define the circumferential clearance. With regard to this aspect, it has been disclosed in prior art. For example, many embodiments have been disclosed in the patent applications of CN101117987A and CN101672335A by the present applicant. There is no need to discuss the above embodiments again, and the full content of the above patent application is incorporated herein. Of course, the cylindrical cam type pin-slot engaging mechanism in FIG. 12 may be repetitively arranged between the tubular section 128 and the tubular body 60, only if the circumferential freedom degree between the orientation pin 122 and the reference hole/slot 126 is adapted to not obstruct the rotation of the orientation ring 120 relating to the guide member 50. In the meantime, the guide groove 130 in FIG. 13(*a*) is changed to a purely axial reference guide groove to make the orientation ring 120 circumferentially secured relating to the intermediate member 90. The relevant embodiments may be referred to in the description regarding FIG. 47 and FIG. 48 in the patent application CN101117987A.

In addition, it should be point out that a recess elastic positioning mechanism may be provided between the tubular section 128 and the tubular body 60, to ensure that the working position of the orientation mechanism D is steady and the working direction is stable. In addition, to ensure that the orientation operation can be process at any time, the orientation ring 120 should be actuated preferably by an elastic member such as a spring. There are many technical proposals, that could be used here, have been disclosed in the prior art, and so there is no need to describe them in detail, for example, the patent application CN101117987A.

It should be apprehended that the position of the orientation mechanism D may be moved to the position pointed by K in FIG. 13(*a*), the circumferential width of the guide groove 130 may be widened properly, and the circumferential clearance placement effect is ensured. That is, comparing with the driving rotation of the orientation ring 120 in the two circumferential directions, the intermediate member 90 rotating reversely cannot wedge because of circumferentially abutting with the orientation pin. Then the clutch C8 turns into a two-way overrunning clutch with a pusher dog, in which the orientation ring 120 used as the pusher dog transfers the torque to the guide member 50. Of course, an end surface force transfer engagement mechanism may be positioned between the pusher dog/orientation ring 120 and the guide member 50. Alternatively, the pusher dog/orientation ring 120 is preferably connected to the inner circumferential surfaces of both the guide member 50 and the intermediate member 90 with a spline, and the overall structure in FIG. 14 may be used.

Embodiment Four

A Two-Way Overrunning Clutch C9 with Radial Abutment Package Housing

Referring to FIG. 14, the friction member 70 of the clutch C9 is a force-closed assembly mechanism rigidly integrated with two semicircle cover type force-limiting member 160. The major difference between the embodiment four and the other embodiments described before is that the force-closed assembly mechanism is formed by radial abutment of two semicircle covers that are substantially symmetrical in the radial direction. The two semicircle covers are rigidly integrated in the axial direction and have coplanar inner end surfaces so as to provide the highest axial rigidity and strength to transfer large torque. The force-limiting members 160*a* and 160*b* are a revolution body formed by the revolution of an entitative generatrix generally in a "U" shape for a half circle about the axis X, to form a circumferentially intact enclosed housing by radially clamping two bearings 158 covering each end of the tubular body 60. Therefore, the guide member 50 and the intermediate member 90 may be rotatably enclosed in the plate shape annular groove/circumferential groove formed by the above enclosed housing. Two pairs of semicircle end surface flanges 162*a* and 162*b* as well as 164*a* and 164*b* at both outer ends of the two force-limiting members are radially joint and then form two full circular end surface flanges. Annular collars 170 and 172 are attached on the outer circumferential surfaces of the flanges at the same diameter with an interference fit. Therefore, the two force-limiting members 160*a* and 160*b* are fastened into a fixed integrity/assembled component.

Actually, the clutch C9 may be in a wheel-shaft transmission form, or further, become a one-way overrunning clutch transferring large torque by removing the orientation mechanism D. This can be achieved by the arrangement that the shape and installation position of the end surface flange 164 and the annular collar 172 are adapted to be axially symmetric with the end surface flange 162 and the annular collar 170 at the left side. Of course, the annular collar 170 and/or 172 may be disposed on the outer circumferential surface of axially middle portion of the two force-limiting members 160 by way of an interference fit, rectangular hole, key connecting, or by the annular collars 170 and/or 172 being replaced by a toothed ring. Alternatively, the two force-limiting members 160 may be fastened into a fixed integrity by welding, rivet joint, or screw. Furthermore, following the embodiments shown in FIG. 11-12, the tubular body 60 extending toward the right direction on the guide member 50 may be removed, and the friction member 70 is independent to the force-limiting member 160, to obtain a shaft-shaft transmission overrunning clutch. The force-enclosed assembly housing/component is formed solely by the force-limiting members, and the assembly housing/component is equal to a friction piece for transferring torque in the force transfer friction mechanism F2.

Referring further to FIG. 14, the elastic expanding open ring sensing member 152 for reducing the wearing is elastically stretched on the inner circumferential surface of the intermediate member 90, to form a sensing rotation friction pair. The protrusion 153 located at an end surface of the sensing member 152 is movably inserted in a recess (not shown) between the opposite surfaces of the friction members 70a and 70b, to enable the sensing member 152 to rotate with the friction member 70. For adapting to the characteristic of the enclosed housing revolving about the guide member 50, the orientation ring 120 of the orientation mechanism is axially located between the inner circumferential surface of the two force-limiting members 160 and the outer circumferential surfaces of the guide member 50 and the intermediate member 90. Each end of the inner circumferential surfaces of the orientation ring 120 is provided with protrusions 124a and 124b. The protrusion 124a is axially received in the guide groove 130 on the outer circumferential surface of the guide member 50, and the protrusion 124b is axially received in the reference hole/slot 126 on the outer circumferential surface of the intermediate member 90. Correspondingly, an actuator including an actuating ring 140 and a wave shape spring 142 is provided as an actuating orientation mechanism D. The actuating ring provided with a group of axial actuating pins on its end surface may be slideably attached at the corresponding outer circumferential surfaces of the two force-limiting members 160. The actuating ring 140 may move the orientation ring 120 to the left with the actuating pins and axial holes on the force-limiting members 160, to change and fix the direction. A spring 142 provided between the orientation ring 120 and the left inner end surface of the force-limiting member 160 may axially move the orientation ring 120 and the actuating ring 140 to the right by way of restoration. Obviously, the orientation ring 120 may be pushed by a ring, which forms an end surface cam mechanism with one of the force-limiting members 160.

The clutch C9 is preferably used as a controllable sliding device of motor vehicles. The orientation characteristic of the overload sliding while the guide member 50 is coupled to the engine is capable of ensuring that the abruptly engaging process of the clutch due to accelerating or braking in the high rotating speed difference slipping condition is smooth friction slipping, rather than rigid pause and knock. Apparently, the clutches C7-C9 are capable to be used as an overrunning coupler.

Examples of Typical Applications

In FIG. 15, a one-way bearing/one-way overrunning clutch C10 (its dustproof cover is not shown) utilizing the present invention is illustrated. The clutch C10 includes a bearing part comprised of a guide member 50 with an outer raceway, an outer ring 190 with an inner raceway, and a group of rollers 192; and an overrunning clutch part comprised of a guide member 50, an intermediate member 90 and a friction member 70. The sectional conic type traction friction mechanism F1 and the force transfer mechanism F2 is composed by an assembly of the friction member 70, which is preferably attached to the inner circumferential surface of the outer ring 190 by a straight spline, with the intermediate member 90 and an outer sectional conic flange 66 on the outer circumferential surface of the guide member 50 respectively, to improve the torque transfer ability and increase the value of ξ. The helical guide teeth of the rotation orientation mechanism G are provided on the inner circumferential surface of the intermediate member 90 and on the outer circumferential surface of the guide member 50 respectively. The spring 150 is preferably an axial compressive plate shape torsion spring, wherein one end of the spring is inserted into the corresponding axial hole on the outer end surface of the intermediate member 90, and the other end is inserted into the corresponding hole on the outer circumferential surface of the guide member 50.

Based on the above advantages, the clutch C10 is apparently capable of replacing the CSK type one-way clutch, and possesses a greater bearing capacity. For further reducing the radial dimension, the guide member 50 may be directly formed on the transmission shaft, the friction member 70 may be directly formed on the outer ring 190, and a needle bearing instead of the ball bearing is added between the intermediate member 90 and the outer ring 190. Thus, the inner diameter of the overrunning clutch without an inner ring may be as less as 3 mm as in the prior art, and the bearing capacity is obviously larger than 0.2 Newton meter of the prior art depending on the line contact friction mechanism. It is easy to be understood that the modified clutch without an inner ring may be achieved by radially overturning the clutch C10 entirely. Apparently, the bag shape package housing shown in FIG. 6-7 is more suitable to be used in a minimized and small type overrunning clutch. For example, the outer ring 190 is used as a bag shape friction member 70, and the clutch C3 is provided at the right half of the clutch C10.

Figure 16:
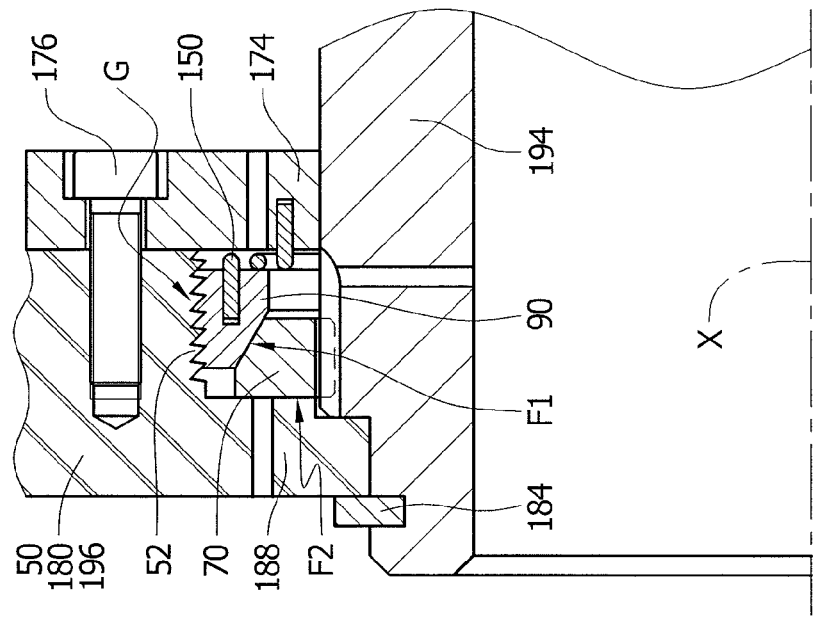
FIG. 16 is a simplified axial sectional view of an embodiment of a guide roller of a hydrokinetic torque converter according to present invention.

FIG. 16 shows a guide roller embodiment C11 of a hydrokinetic torque converter incorporating the present invention. A guide wheel 196 integrated with the guide member 50 of the embodiment C11 is rotatably fastened at the outer circumferential surface of the static ring 194 by a clip ring 184. The traction friction mechanism F1 and the force transfer mechanism F2 are composed by an assembly of the friction member 70, which is circumferentially attached at the outer circumferential surface of the static ring 194 by a spline, with the inner frusto-conic surface of the intermediate member 90 and inner end surface of the guide member 50 respectively. The helical guide teeth of the rotation orientation mechanism G are provided on the outer circumferential surface of the intermediate member 90 and on the inner circumferential surface of the guide member 50 respectively.

Figure 17:
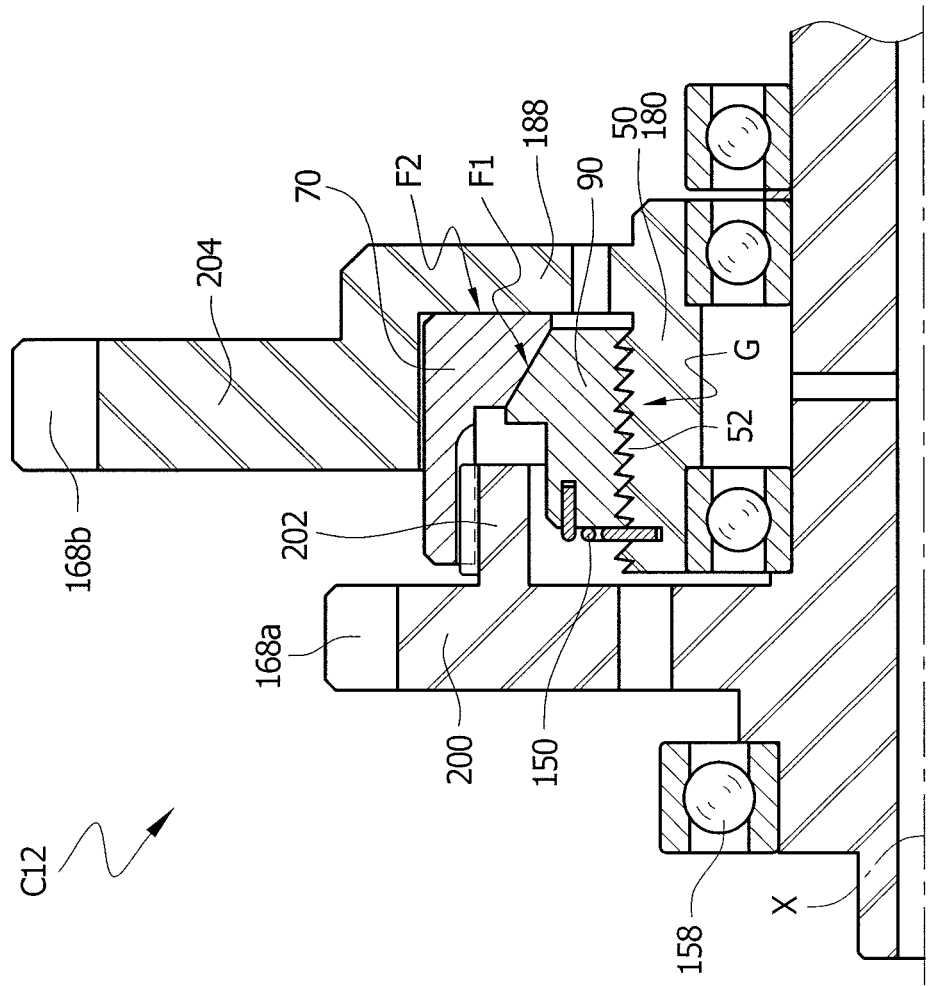
FIG. 17 is a simplified axial sectional view of an embodiment of a two-shaft assembly of a loader according to present invention.

Referring to FIG. 17, the embodiment C12 is a two-shaft assembly of a loader transmission incorporating the present invention. A gearwheel 204 with the teeth 168b is integrated with the guide member 50, and is radially positioned at a shaft, which extends toward one end, of a pinion 200 by a bearing. The traction friction mechanism F1 and the force transfer mechanism F2 are composed by an assembly of the friction member 70, which is circumferentially attached on the annular end surface flange 202 of the pinion 200 having the teeth 168a by a spline, with the outer frusto-conic surface of the intermediate member 90 and the inner end surface of the end surface circumferential groove of the gearwheel 204 respectively. The helical guide teeth of the rotation orientation mechanism G are provided on the inner circumferential surface of the intermediate member 90 and on the outer circumferential surface of the guide member 50 respectively.

Figure 18:
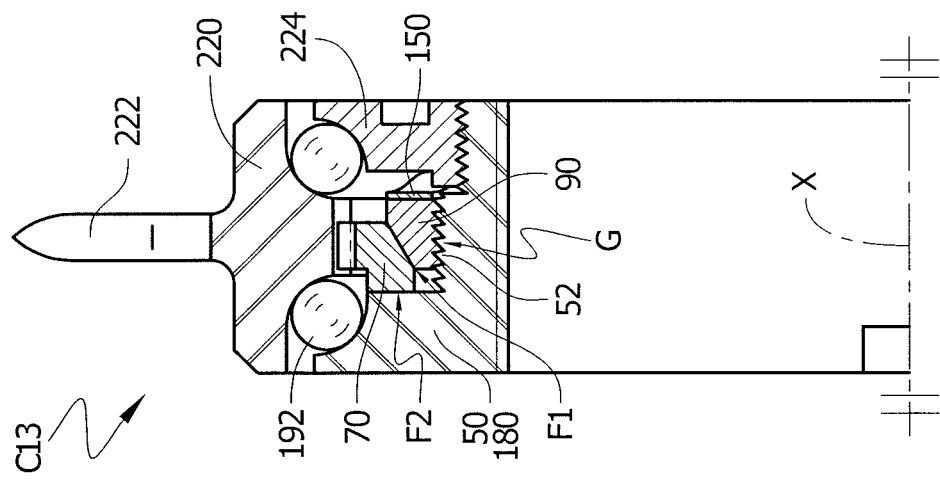
FIG. 18 is a simplified axial sectional view of an embodiment of a flywheel of a bicycle according to present invention.

FIG. 18 shows a flywheel embodiment C13 of a bicycle or an electric bicycle. Wherein, a flywheel outer ring 220 with sprockets 222 is rotatably fixed at the guide member 50 serving as the inner ring of the flywheel by two sets of balls 192 and a flywheel cap 224. Similar as the embodiment C10, the friction member 70 is preferably circumferentially fixed on the inner circumferential surface of the outer ring by a spline connection for not bringing an axial pressure on the balls 192. In addition, the structure of the overrunning clutch is similar as that shown in FIG. 15, except that the rotate friction surface of the force transfer friction mechanism F2 is changed to an end flat surface, and the spring 150 is changed to a wave shape spring. Apparently, the engagement idle stroke or slippage angle of the above flywheel is approximate to zero, and the bearing capacity is not smaller than that of the ratchet flywheel.

FIG. 19 shows a wheel hub embodiment C14 of an electric bicycle utilizing the present invention. A hub housing 206 revolving about the axis X and being rigidly integrated with a guide member 50 and a force limiting member 180 is radially fastened on a hub shaft 216 by a bearing 158. A decelerator base mounting 214 is installed within the hub housing 206. A gear 210 and a shaft gear 212 being integrated together are mounted in the decelerator base mounting 214. The hollow output shaft gear 208, which revolves about the axis X, of an electric motor drives the gear 210 as being engaged with the shaft gear 208, and then drives the friction member 70 being engaged with the gear 212 through the gear 212. The friction member 70 encircles the guide member 50 with a clearance, and then is assembled with the inner end surface of a force limiting end 188 and the outer end surface of the intermediate member 90 to form a force transfer friction mechanism F2 and a traction friction mechanism F1 respectively. The helical guide teeth of the rotation guide mechanism G are positioned at the inner circumferential surface of the intermediate member 90 and the outer circumferential surface of the hollow shaft.

FIG. 20 shows an embodiment of an electric actuating overrunning clutch C15 of a motorcycle adopting the present invention. The guide member 50, which is an annular end surface flange, is rigidly integrated at one end of an actuating gear plate 198. The actuating gear plate 198 rotatably encircles the tubular body 76 with a clearance. Also, the actuating gear plate 198 and the intermediate member 90 are frictionally connected to the friction member 70 from two sides respectively. Thus, the axial positioning of the above members is achieved. Here, a plate shape or an axial compressive plate shape torsion spring 150 is further used to restrict the intermediate member 90 in an axial direction. Preferably, the friction member 70 of the clutch C3 may be used as the gear plate 198 directly.

Obviously, if the guide member 50 and intermediate member 90 in FIG. 15, 17-19 are viewed as screw and nut respectively, and the friction member 70 is viewed as a jointed member, then the typical applications would be equal to one way torque transmission between a "screw" and a "jointed member". But apparently, their working theory and purpose are substantially different from each other. Without any inventive work, if only based on the prior technique, theory and common sense of "screw" and/or "helical", it is impossible to "logically" conceive or derive those typical applications and/or technical solution of the present invention practically or theoretically. First, there isn't any recognizable relevant technical suggestion or hint in the prior art. Secondly, apart from the above brief description of the background technique, the overrunning clutch relating to spatial mechanism in the prior art includes at most the SSS auto-synchronous clutch with at least 50 years history, and the guided jaw overrunning clutch disclosed in the patent application CN101672335A submitted by the present applicant. Further, long time ago, from the invention of a helical water carrying equipment by Archimedes until now, the transmission guide theory has been studied and applied for 2230 years, the history of manufacturing helical/screw with modern machinery is longer than 230 years, and they are used everywhere. Therefore, it is impossible for people not to practice better technical solution in any application condition or any technical innovation if there is any relevant technical suggestion or hint. Thirdly, even though some of the relevant documents involve spatial movement mechanism depending on an axial force, the working theory and physical essence of a stable non-slid engagement of corresponding friction pairs of the relevant spatial mechanism and plane mechanism are not acquired and disclosed due to the limitation or barrier of the conventional theory of the prior art, as well as conventional thinking and technical preconception. Therefore, the technical solution of the present invention has never been proposed until the present invention.

According to the above description, the present invention not only has the potential to replace the current techniques, but also has the potential to expand its depth and width of applications in larger torque/power, higher rotating speed and transformation frequency, larger or smaller dimension, and more mechanical transmission field. The present invention is capable of efficiently resolving any corresponding problems in the prior art, no matter in large scale or miniature transmission, precise graduation or high speed/high frequency transmission, or any type of decelerating transmission, positioning hinge and spanner. For example, the present invention may be applied in the actuating mechanism of self-actuate prime mover including the engine of airplane, and thus the constant connection of the actuator with the prime mover, overloading protection and fast actuating, complete removal of the unnecessary mechanism including the electromagnetic switch can be achieved preferably. The arrangement of the one-way overrunning clutch according to the present invention between the output shaft and the base of an internal-combustion engine may economically and reliably realize the purpose of preventing the reverse rotation of the internal-combustion engine. Thus, all the efforts and costs in preventing the system or people from hurting by the reverse rotation may be avoided in the simplest way. Finally, all the efforts and costs in a rotation angle measurement for removing the effect of reverse rotation to ensure the proper working condition of the electric ejecting system of an internal-combustion engine may be avoided.

Above is merely specification and illustration of the prevent invention regarding its embodiments, and is in particular to certain extents. It should be understood that the embodiments and figures mentioned hereinabove are only for the purpose of illustration and would not limit the protection scope of the present invention. Its variation, equalization, modification, and alternation of the structure and arrangement of the components are not considered to deviate from the spirit and scope of present invention.

The invention claimed is:

1. A spatial wedging friction overrunning clutch, comprising:
   at least one axially engaged traction friction mechanism revolving about an axis, said traction friction mechanism comprising at least one intermediate member and a friction member revolving about said axis and provided with a traction friction surface, the intermediate member and the friction member being abutted against each other in the axial direction to form at least one traction friction pair for producing and transmitting traction friction torque therebetween;

at least one rotation guide mechanism, which revolves about said axis and provides engagement force to said traction friction mechanism, wherein the rotation guide mechanism includes said intermediate member and a guide member revolving about said axis and provided with a corresponding guide surface, the intermediate member and the guide member being abutted against each other in the axial direction to form a guide friction pair, wherein a lead angle $\lambda$ at the abutment position of the guide friction pair is greater than zero and smaller or equal to $\xi$, , that is, $0<\lambda\leq\xi$, , wherein within the range of $\lambda$, a rotation tendency of the guide member relative to the friction member along two opposite circumferential directions can cause the overrunning clutch to be automatically brought into an engaged situation for transmitting torque and automatically come out of the engaged situation for overrunning respectively by means of the traction friction torque, wherein $\xi$ is the maximum value of the lead angle $\lambda$ that enables the guide friction pair to be self-locked circumferentially.

2. The overrunning clutch according to claim 1, characterized in that the overrunning clutch comprises two friction mechanisms each being provided an axial engaging force by the rotation guide mechanism and revolving about the axis, one of the two friction mechanisms is the traction friction mechanism, the other of the two friction mechanisms is a force transmitting friction mechanism at least unrotatably integrated with the guide member and the friction member respectively, or a further traction friction mechanism.

3. The overrunning clutch according to claim 2, characterized in that said lead angle $\lambda$ is greater than $\zeta$, , that is $\zeta, <\lambda\leq\xi$ , wherein $\zeta$, is the minimum value of the lead angle $\lambda$ that enables the guide friction pair to be self-locked circumferentially, and also the maximum value of the lead angle $\lambda$ that enables a traction friction pair to be self-locked circumferentially, and the meaning of $\xi$ is the same as above.

4. The overrunning clutch according to claim 2, characterized in that when $\zeta, >0$, said lead angle $\lambda$ is smaller than or equal to $\zeta$, , that is $0<\lambda\leq\zeta$, , wherein $\zeta$, is the minimum value of the lead angle $\lambda$ that enables the guide friction pair to be self-locked circumferentially.

5. The overrunning clutch according to claim 2, characterized in that:
it further comprise at least one force limiting member; and
at most one of said guide member, said intermediate member and said friction member is a force-closed assembly incorporating said force limiting member by way of fixed connection so as to establish an axial force-closed abutment connection therebetween.

6. The overrunning clutch according to claim 2, characterized in that:
said rotation guide mechanism has rotation guide function with respect to two different circumferential directions, and said guide member has said guide surface with respect to the two different circumferential directions; and
it further comprises an orientation mechanism, which operatively restricts the intermediate member to be within at least two different circumferential area relative to said guide member so as to enable the intermediate member to circumferentially engage a relative rotation direction of the guide member, and further define the circumferential direction corresponding to guide rotation of the rotation guide mechanism.

7. The overrunning clutch according to claim 6, characterized in that, said orientation mechanism is a pin-slot engagement mechanism comprising at least one protrusion and at least one recess, the at least one protrusion and the at least one recess respectively provided on one of the intermediate member and a rotation member circumferentially fixed with the intermediate member, and one of the guide member and a rotation member circumferentially fixed with the guide member.

8. The overrunning clutch according to claim 6, characterized in that, it further comprises an actuating mechanism for changing orientation status of the orientation mechanism.

9. The overrunning clutch according to claim 1, characterized in that, it further comprises an elastic keeping mechanism having at least one elastic member for constantly enabling said intermediate member and said friction member to be in at least indirect friction connection.

10. The overrunning clutch according to claim 1, characterized in that, the guide surface of the guide member is a helical tooth flank, said helical tooth flank provided on a surface including end surface, inner circumferential surface and outer circumferential surface of the guide member; an included angle between the helical tooth flank and the axis being greater than 0 degree and smaller than 180 degree in the axial plane.

11. The overrunning clutch according to claim 10, characterized in that: said intermediate member is an annular member formed about said axis and having a corresponding revolving friction surface and a guide surface, the guide surface being a helical tooth flank having complementary configuration with the guide surface of the guide member, and being correspondingly provided on one of the end surface, the outer circumferential surface and the inner circumferential surface of the intermediate member.

12. The overrunning clutch according claim 5, characterized in that: one of said guide member, said intermediate member, said friction member and said force limiting member is a bag shape annular member, an inner circumferential surface thereof provided with a half circumferential annular groove and a through hole communicating from the groove to an outer circumferential surface of the bag shape annular member.

13. The overrunning clutch according to claim 10, characterized in that: the helical teethed surfaces are respectively provided on the inner circumferential surface and the circumferential surface opposing each other of the guide member and the intermediate member, the guide member provided with a force limiting end portion.

14. The overrunning clutch according claim 5, characterized in that: said force limiting member is a cup shape housing with a central circular hole.

15. The overrunning clutch according claim 5, characterized in that: said force-closed assembly comprises two semicircle housings and at least one annular collars being at least substantially symmetrical along radial direction, the shapes of the two semicircle housing are combined such that, the combined component formed by radial joint of the two semicircle housings is provided with a central circular hole about the axis and a circumferential groove about the axis and disposed on an inner circumferential surface of the central circular hole, said annular collar disposed on an outer circumferential surface of a middle portion or an outer end portion of the combined component to fasten said combined component.

16. The overrunning clutch according claim 1, characterized in that: at least one of the respective friction surfaces of at least one of said traction friction mechanism and said force transmit mechanism is a frusto-conic surface with a semi-conic angle greater than 0 degree and smaller than 180 degree.

17. The overrunning clutch according claim 1, characterized in that: the traction friction mechanism is a friction mechanism having multiple friction pieces, in which two sets of axially interlaced friction pieces, each comprising at least one friction piece, are circumferentially fixed to the friction member and the intermediate member respectively.

18. The overrunning clutch according claim 1, characterized in that: the force transmitting mechanism is a friction mechanism having multiple friction pieces, in which two sets of axially interlaced friction pieces, each comprising at least one friction piece, are circumferentially fixed to the friction member and the guide member respectively.

19. The overrunning clutch according to claim 1, characterized in that:
    said rotation guide mechanism has rotation guide function with respect to two different circumferential directions, and said guide member has said guide surface with respect to the two different circumferential directions; and
    it further comprises an orientation mechanism, which operatively restricts the intermediate member to be within at least two different circumferential area relative to said guide member so as to enable the intermediate member to circumferentially engage a relative rotation direction of the guide member, and further define the circumferential direction corresponding to guide rotation of the rotation guide mechanism.

20. The overrunning clutch according to claim 3, characterized in that:
    said rotation guide mechanism has rotation guide function with respect to two different circumferential directions, and said guide member has said guide surface with respect to the two different circumferential directions; and
    it further comprises an orientation mechanism, which operatively restricts the intermediate member to be within at least two different circumferential area relative to said guide member so as to enable the intermediate member to circumferentially engage a relative rotation direction of the guide member, and further define the circumferential direction corresponding to guide rotation of the rotation guide mechanism.

* * * * *